(12) United States Patent
Mitchell et al.

(10) Patent No.: US 10,023,359 B2
(45) Date of Patent: Jul. 17, 2018

(54) SHRINK LABELS

(71) Applicant: UPM Raflatac Oy, Tampere (FI)

(72) Inventors: Noel Mitchell, Wuppertal (DE);
Klaudia Korman, Bielany Wroclawskie (PL); Markus Kivelä, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 14/900,319

(22) PCT Filed: Dec. 22, 2014

(86) PCT No.: PCT/FI2014/051049
§ 371 (c)(1),
(2) Date: Dec. 21, 2015

(87) PCT Pub. No.: WO2016/102742
PCT Pub. Date: Jun. 30, 2016

(65) Prior Publication Data
US 2017/0283116 A1    Oct. 5, 2017

Related U.S. Application Data

(60) Provisional application No. 62/103,092, filed on Jan. 14, 2015.

(51) Int. Cl.
*B65D 23/08* (2006.01)
*B32B 27/08* (2006.01)
(Continued)

(52) U.S. Cl.
CPC .......... *B65D 23/0878* (2013.01); *B29C 55/04* (2013.01); *B32B 27/08* (2013.01);
(Continued)

(58) Field of Classification Search
CPC .................................................. B65D 23/0878
(Continued)

(56) References Cited

U.S. PATENT DOCUMENTS

2006/0159878 A1*  7/2006  Wakai ..................... C08L 23/08
                                                        428/34.9
2007/0212539 A1*  9/2007  Yamada .................. B32B 27/08
                                                        428/383

FOREIGN PATENT DOCUMENTS

JP    2010030287 A  *  2/2010
WO    2015004310 A1    1/2015
(Continued)

OTHER PUBLICATIONS

International Search Report dated Mar. 19, 2015; International Application No. PCT/FI21014/051049; International Filing Date Dec. 22, 2014 (5 pages).
(Continued)

*Primary Examiner* — Brent T O'Hern
(74) *Attorney, Agent, or Firm* — Cantor Colburn LLP

(57) ABSTRACT

The invention relates to a shrink label. According to an embodiment the shrink label comprises an uniaxially oriented multilayer face film comprising skin layers including polyethylene polymer(s) and at least two cyclic polymers comprising different glass transition temperatures between 30 and 100° C. and the difference between the glass transition temperatures being between 5 and 60° C., and wherein the multilayer face film is seamed by a solvent. The invention further relates to a method for providing a shrink label, use of the shrink label, method for providing a shrink label and method for labelling.

10 Claims, 6 Drawing Sheets

(51) Int. Cl.
  *B32B 27/32* (2006.01)
  *B29C 55/04* (2006.01)
  *B65C 3/26* (2006.01)
  *B65C 3/06* (2006.01)
  *B29K 23/00* (2006.01)
  *B29L 31/00* (2006.01)

(52) U.S. Cl.
  CPC .............. *B32B 27/32* (2013.01); *B65C 3/065* (2013.01); *B65C 3/26* (2013.01); *B29K 2023/00* (2013.01); *B29K 2995/0051* (2013.01); *B29K 2995/0096* (2013.01); *B29L 2031/744* (2013.01); *B32B 2307/516* (2013.01); *B32B 2307/736* (2013.01); *B32B 2519/00* (2013.01)

(58) Field of Classification Search
  USPC .......................................................... 428/57
  See application file for complete search history.

(56) References Cited

FOREIGN PATENT DOCUMENTS

WO   2015004311 A1   1/2015
WO   2015004312 A1   1/2015

OTHER PUBLICATIONS

Written Opinion dated Mar. 19, 2015; International Application No. PCT/FI2014/051049; International Filing Date Dec. 22, 2014 (8 pages).

\* cited by examiner a)

b)

c)

SHRINK LABELS

FIELD OF THE APPLICATION

The application concerns shrink labels and a method for providing shrink labels. Further the application concerns a method for labelling an item.

BACKGROUND OF THE APPLICATION

It is general practice to apply a label to a surface of an item to provide decoration, and/or to display information about the product being sold, such as the content of the item, a trade name or logo. The label comprises at least a printable face layer. The printable face layer is able to carry information on the front and/or back side of the face layer. Further the label should be attachable to the surface of an item to be labelled. In addition to pressure-sensitive, wet glue and wrap around labels other labelling technologies are available, for example shrink sleeve labels. Shrink sleeve labels may be provided by forming a tube of plastic film, which may be dropped over an item to be labelled and subsequently fed the item through a shrink-tunnel at elevated temperature causing the film to shrink and fit the shape of the item.

SUMMARY OF THE APPLICATION

It is an aim of the embodiments to provide a shrink label suitable for labelling of an article. Further it is an aim to provide a method for manufacturing a shrink label and a method for labelling an item with a shrink label.

One embodiment provides a shrink label capable to shrink under exposure to external energy. The shrink label comprises an uniaxially oriented multilayer face film including a first skin layer forming an uppermost layer of the face film and a second skin layer forming an undermost layer of the face film. The said skin layers comprise: at least one of the following polyethylene polymers: low density polyethylene, medium density polyethylene and linear low density polyethylene; and at least two cyclic polymers, wherein the at least two cyclic polymers comprise cyclic olefin copolymer, cyclic block copolymer, cyclic olefin polymer, or any combination thereof. The at least two cyclic polymers comprise different glass transition temperatures between 30 and 100° C. and the difference between the glass transition temperatures is between 5 and 60° C. The multilayer face film is turned over itself so that opposite edges of the multilayer face film are overlapping and forming an area wherein the first skin layer and the second skin layer are adjacent to each other and bonded together by a solvent so as to form a seam for the shrink label.

One embodiment provides a use of a shrink label for labelling of an item.

One embodiment provides a combination of a shrink label and an item.

One embodiment provides a method for manufacturing a shrink label. The method comprises at least the following steps:
 providing a multilayer face film comprising a first skin layer and a second skin layer, wherein said skin layers comprise at least one of the following polyethylene polymers: low density polyethylene, medium density polyethylene and linear low density polyethylene; and at least two cyclic polymers, wherein the at least two cyclic polymers comprises cyclic olefin copolymer, cyclic block copolymer, cyclic olefin polymer, or any combination thereof; and wherein the at least two cyclic polymers comprise different glass transition temperatures between 30 and 100° C. and the difference between the glass transition temperatures is between 5 and 60° C.;
 stretching the multilayer face film uniaxially so as to provide uniaxially oriented multilayer face film;
 cooling the uniaxially oriented multilayer face film so as to provide shrink potential in the uniaxial stretching direction;
 applying a solvent to an edge area of the first skin layer or the second skin layer;
 folding the multilayer face film onto itself so that opposite edges of the multilayer face film are overlapping and forming an area wherein the first skin layer and the second skin layer are adjacent to each other;
 bonding the area wherein the first skin layer and the second skin layer are adjacent to each other together with the solvent so as to form a seam.

One embodiment provides a method for labelling of an item. The method comprises at least: applying a shrink label around the item, wherein the uniaxial orientation direction of the multilayer face film is extending circumferentially around the item; and heating the shrink label at temperature between 65 and 140° C. so as to form a tight fitting label around the item. Further embodiments of the application are presented in the dependent claims.

According to an example, the at least two cyclic polymers comprises one cyclic polymer having the glass transition temperature below 70° C. and another cyclic polymer having the glass transition temperature above 70° C.

According to an example, the one cyclic polymer is cyclic olefin copolymer of norbornene and ethene and the another cyclic polymer is cyclic olefin copolymer of norbornene and ethene.

According to an example, an amount of the one cyclic copolymer is between 44 and 77 wt. % and an amount of the another cyclic copolymer is between 10 and 44 wt. %.

According to an example, an amount of polyethylene polymer(s) is between 5 and 20 wt. %.

According to an example, the polyethylene polymer is one of the following: copolymer of ethylene and 1-octene, and copolymer of ethylene and hexene.

According to an example, the solvent is one of the following: alpha-pinene, limonene, mixture of tetrahydrofuran and 1,3-dioxolene, o-chlorotoluene, 4-chlorotoluene, and p-chlorobenzotrifluoride.

According to an example, the uniaxially oriented multilayer face film comprises an orientation ratio of at least 3.

According to an example, the multilayer face film is uniaxially oriented in a transverse direction and the transverse direction extends around a circumference of the shrink label.

According to an example, the multilayer film is capable to shrink in the uniaxial orientation direction of the face film between 20 and 75% at a temperature between 65 and 98° C.

According to an example, the multilayer face film has a three layer structure further comprising a core layer between the first skin layer and the second skin layer.

According to an example, the method comprises applying the solvent, which is at least one of the following: alpha-pinene, limonene, mixture of tetrahydrofuran and 1,3-dioxolene, o-chlorotoluene, 4-chlorotoluene, and p-chlorobenzotrifluoride.

According to an example, the method comprises the stretching provided in a temperature between 50 and 130° C. and comprising an uniaxial stretching ratio of at least 3.

According to an example, the method comprises the cooling comprising treating the uniaxially oriented face film with a degreasing temperature profile between 20 and 80° C.

DESCRIPTION OF THE DRAWINGS

In the following some examples and embodiments of the invention will be described in more detail with reference to appended drawings, in which.

DETAILED DESCRIPTION OF THE APPLICATION

In this description and claims, the percentage values relating to an amount of raw materials are percentages by weight (wt. %) unless otherwise indicated. Word "comprising" may be used as an open term, but it also comprises the closed term "consisting of". Unit of thickness expressed as microns corresponds to µm. Unit of temperature expressed as degrees C. corresponds to ° C. The following reference numbers and denotations are used in this application:

Sx, Sy, Sz 3D coordinates,
TD transverse direction,
CD cross direction,
MD machine direction,
DIR1 direction,
DR draw ratio (stretching ratio)
MRK1 graphics (printing, print layer),
L1 length of a label film prior to shrinking,
w1 width of a label film prior to shrinking,
d2 thickness of a label film prior to shrinking,
L2 length of a shrunk label film,
w2 width of a shrunk label film,
d2 thickness of a shrunk label film,
1 a face film,
2 a first skin layer,
4 a core layer,
6 a second skin layer,
8 a first longitudinal edge of a face film,
9 solvent,
10 a shrunk face film,
11 a leading edge of a face film,
12 a second longitudinal edge of a face film,
13 a trailing edge of a face film,
14 a seam,
15 a roll fed shrink film label,
16 a shrink sleeve label,
18 a shrunk label,
20 an item,
22 a labelled item,
23 a neck of a bottle.

A term "label" refers to a piece of material, which is used for labelling of an item. Label may be used to identify something. Label may be attached to an item. In other words, label is suitable to be applied to a surface of an item to provide decoration, and/or to display information about the product being sold, such as content information, a trade name, a logo, a barcode, or any other graphics. The item may be also called as an article, or a substrate. Preferably, the label comprises a face film and at least some graphics on at least one surface of the face film. A face film may also be referred to as a label film. The graphics may comprise, for example, printed information and/or decoration. The graphics, such as printing or other type of visual coatings, may be applied on the face layer (either side) in a single process or via several successive steps. It is also possible that the visual coating include metallic foil or ink or similar.

Figure 2:
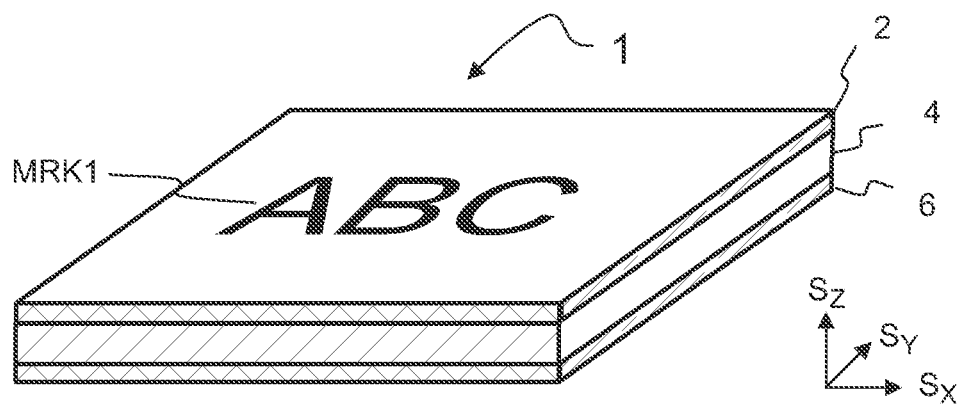
FIG. 2 shows, in a perspective view, an example embodiment of a multilayer face film for a label.

Referring to FIG. 2, at least one surface of the face film 1 of the label may comprise graphics MRK1. The face film may comprise or consist of a multilayer plastic film structure comprising e.g. three layers. In addition, the label may comprise adhesive. The adhesive may be used to enable the label to be attached to an item, an article or a container. In other words, "label" refers to an object having length, width and thickness. The object may be a plastic film or it may be derived from a plastic film. A label comprises a first surface portion. The first surface portion is intended to be attached to a second surface portion different from the first surface portion. The second surface portion may be a surface portion of the label different from the first surface portion, or a surface portion of another object. The first and second surface portions may be adjoined to each other by various means, such as by using an adhesive or heat, for example by welding.

Labels may be used in wide variety of labelling applications and end-use areas. For example in beverage labelling, food labelling, home and personal care product labelling, and labelling of industrial products. The surface of the labelled item may be plastic, rubber, glass, metal, ceramic, wood, fabric or paper based. The labelled item may be a container, such as a bottle. For example, polyethylene terephthalate (PET) bottle. Alternatively, the labelled item may be a bottle made of polypropylene (PP) or high density polyethylene (HDPE). Or it could be a glass container a metal container. It could also be any other rigid or solid item or items to be combined together. For example in multi-packed containers or where you might want to pack multiple items together which are not necessarily containers as such, for example separate blocks.

Figure 1:
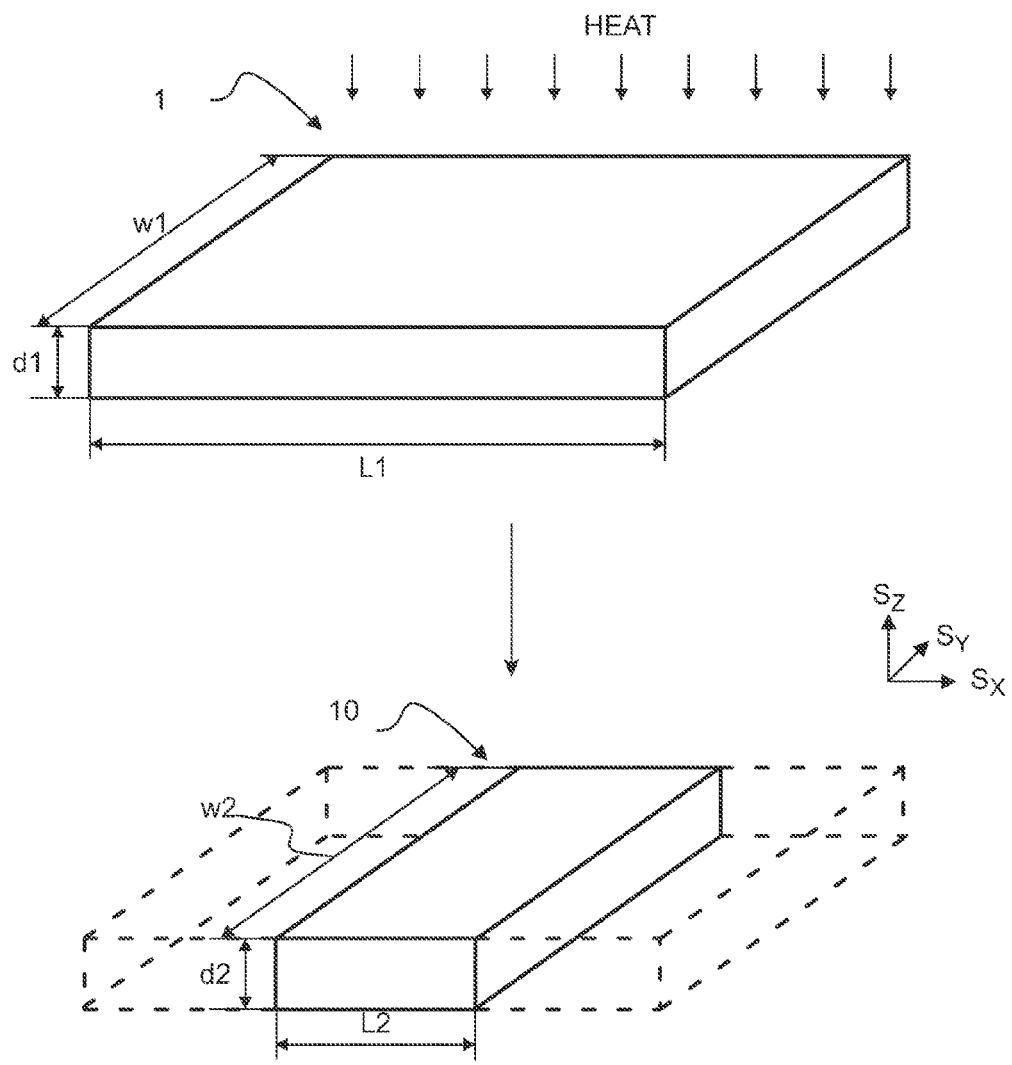
FIG. 1 shows, in a perspective view, an example embodiment of a heat shrinking of a face film.

Term "shrinkable" refers to a property of a face film or a label made thereof to shrink under exposure to external energy. Referring to FIG. 1, a heat shrinkable face film 1 shrinks when exposed to an elevated temperature. Heat may be applied via hot air. Alternatively, heat may be applied via infra-red radiation (IR) or steam. In response to application of heat, the heat face film or a label comprising said face film is arranged to shrink. The heat shrinkable film is able to shrink in the stretching (orientation) direction of the film. Shrinkage may be focused on a local area or to the whole face film or label area. Local shrinkage may be focused on required areas, for example on an edge area of a label. Whole label may be shrunk in a direction extending circumferentially around a container to conform to the outside (external) shape of the container. Local shrinkage may be focused on required areas, for example on an edge area of an article. Due to the shrinking effect, in addition to carrying printed information, the shrunk label may also provide certain amount of additional structural support to the labelled items, for example, to a thin walled plastic bottle. Further, the label material may also provide certain tactile feeling for the end user in addition to the purely visual effects.

"Heat shrink film" and "heat shrink label" refers to a face film and a label produced thereof having at least 15%, preferably at least 25%, or at least 35% shrinkage between temperature of 65 and 98° C. Below 65° C. shrinkage is less than 10%, preferably less than 5%, for example between 0 and 10%, or between 0.5 and 5%. Film(s) which are not able to shrink as presented above are not suitable for face films of labels and are thus not suitable for heat shrink labelling applications. A heat shrink label comprises or consists of a heat shrink film and is suitable to be fitted around an article to be labelled and shrunk around the article. In addition, a heat shrink label may comprise at least some graphics on a surface of the heat shrink film. A heat shrink label may be a heat shrink sleeve label (HS) or a roll-fed shrink film label (RFS). A heat shrink film without additional graphics, such as printing, may be used, for example, as a shrinking seal label, a tamper evident label or security label. A heat shrinkable label comprises or consists of a face film configured to shrink between 20 and 70%, preferably between 25 and 65% at a temperature range between 65 and 98° C. In addition, the heat shrinkable label comprises or consists of a face film configured to shrink less than 10% at temperature below 65° C.

Preferably, a heat shrink label comprises a multilayer face film (label film) comprising or consisting of heat shrink plastic film layer(s). In addition, the shrink label may comprise at least some graphics on a surface of the face film. In addition, the shrinkable label may comprise an adhesive. The adhesive may be applied only in a joint area of cylindrical label, wherein the opposite edges of the face film are overlapping. For example, the adhesive may be applied between the overlapping edges. Alternatively or in addition, the adhesive may be applied between the face film and surface of an item to be labelled.

Term "roll-fed shrink film label" (RFS) refers to labelling process, where a ready cut label is rolled over a container and then the label is shrunk in order to conform shape and size of the container. Label is supplied from a reel, cut into individual labels and applied around an item. These "roll-fed shrink film labels" are printed and the slit into narrow rolls, which are transferred to rotary applicators where they are seamed on a mandrel using heat via a hot-bar or using solvent via a liquid-bonding process. The formed tubes are either fed (dropped down) over the bottles or alternatively the bottles are pushed down into the formed tubes. Adhesives (e.g. hot melt adhesive) is used to hold the label on the surface of the item. The adhesive may be applied on the label or on the container in an area between the leading edge and the surface of the container. The adhesive may also be applied between trailing and leading edges of the label. When rolled over to an item, the trailing and leading edges may overlap and form a seam. Subsequent shrinking process at high temperatures enables tight fitting of the label around the item. Heat shrinking may occur at a shrink tunnel, where for example hot air may be blown towards passing items. The described process may be called as on-line labelling process. Roll-fed shrink films may be uniaxially oriented in machine direction (MD). Alternatively, films may be uniaxially oriented in transverse direction. When a label consists of a MDO shrink film as a face stock, and the machine direction of the label extends circumferentially around the item, the label is arranged to shrink primarily in the orientation direction when heated.

Term "shrink-sleeve" or "heat shrinkable sleeve film" (HS) refers to a labelling process, where a preformed label tube (or sleeve) is introduced around an item. Shrink sleeve label comprises or consists of transverse direction oriented (TDO) shrink film. The film is solvent seamed into a continuous tube label around the axis extending to the machine direction ($S_x$). The formed continuous tube (or sleeve) is cut into predetermined lengths and supplied as a form of individual tube label around an item. In other words, during labelling the tube is opened and either pulled or dropped over a mandrel where it is cut to the required length and dropped over the containers to be labelled. In order for this process to function efficiently, the films used need to have a low coefficient of friction. The item or container may be warmed before a cylindrical tube label is introduced over it. Tube around an item is heated in order to shrink the tube label around the item. The transverse direction orientation of the tube label extends circumferentially around the item. Thus, label primarily shrink in the transverse direction.

Term "machine direction" MD refers to the running direction $S_x$ of the face film or continuous label web during manufacturing. "Transverse direction" TD or "cross direction" CD refers to the direction $S_y$ perpendicular to the running direction $S_x$ of the face film or label web. Directions are shown, for example, in FIG. 2.

Term "printable surface" refers to a surface, such as a surface of a face layer, that is suitable for printing. Printable surface is also able to maintain the printing, such as printed text and/or graphics. Printable surface has sufficiently high surface energy. A low surface energy may lead to poor retaining capability of printing ink applied to the surface. For example, a face layer may have a surface energy at least 36 dynes/cm, preferably at least 38 dynes/cm, or at least 44 dynes/cm measured according to the standard ASTM D-2578. The surface tension may be between 36 and 60 dynes/cm, preferably between 38 and 56 dynes/cm, or between 44 and 50 dynes/cm. The surface tension level may also be maintained higher than or equal to 38 dynes/cm after 50 or 120 days. According to an embodiment, a printable heat shrinkable face layer and a label produced thereof comprises at least one printable face layer.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer refers to a configuration of a label structure, where the topmost layer forms upper part of the label structure arranged opposite to the surface attaching the surface of an item when labelled. Topmost layer of a label may be, for example, a skin layer, a print layer, a top coating (over-vanishing layer).

Undermost layer refers to a surface forming bottom part of the label structure arranged opposite to the topmost surface. Undermost layer is in contact with the surface of an article when labelled. In a shrink label the undermost and topmost layers of the label structure may contact each other in a seam area where the edges of the face film are overlapping. In an example, in the seam area edges of the face film are overlapping and a first skin layer and a second skin layer are adjacent to each other. Seam is formed when the adjacent layers are bonded together. Undermost layer of a label may be, for example a skin layer, a print layer, a top coating (over-vanishing layer).

Haze is a property used to describe transparency of a plastic film or a face stock of label consisting of the plastic film. Haze relates to scattering of light by a film that results in a cloudy appearance of the film. Haze corresponds to the percentage of light transmitted through a film that is deflected from the direction of the incoming light. Haze may be measured according to standard ASTM D1003.

Structures of Shrink Labels

Shrinkable labels, also referred to as shrink labels, are shrinking under exposure to external energy, such as elevated temperature. Shrinkable labels include both shrink sleeve labels and roll-fed shrink film labels. The shrinkable label may also be one of the following: tamper evident label, security label and shrinking seal label. Shrinkable labels comprise or consist of an oriented non-annealed face film.

A shrink label comprises or consists of an oriented and non-annealed face film, which is therefore shrinkable. The face film may be drawn (stretched) in one direction. The film may be stretched in a machine direction. Alternatively, the film may be stretched in a transverse direction The resulting film is thus monoaxially (uniaxially) oriented (MO). Monoaxially oriented film may be machine oriented (MDO) or transverse oriented (TDO) in accordance to the direction of the orientation (stretching). The oriented film is suitable for shrinking along the direction of orientation, during exposure to external energy. Preferably, uniaxially oriented film has shrinking less than 10% or less than 5% in other directions (non-shrinking directions) of the film, during exposure to external energy. Expansion of the uniaxially oriented film is less than 5% in other directions (non-shrinking directions) of the film. Such a non-annealed film has not been specifically temperature treated to become a dimensionally stable, non-shrinking film.

A face film may be stretched (oriented) at least in one direction. The film may be stretched in a machine direction (MD), in a transverse direction (TD), or both. A face film oriented both is machine direction and in transverse direction is called biaxially oriented. A face film may be mono-axially (uniaxially) oriented. The face film of a shrink sleeve label may be mono-axially oriented in transverse direction (TD). The face film of a roll-fed shrink film label may be mono-axially oriented in machine direction (MD). According to an embodiment, a face film comprises or consists of a transverse direction oriented (TDO) face film, which is non-annealed and therefore shrinkable in the orientation direction.

During stretching the randomly oriented polymer chains of the extruded films are oriented in the direction of stretching (drawing). Orientation under uniaxial stress provides orientation of polymer chains of the plastic film in the direction of stress provided. In other words, the polymer chains are oriented at least partially in the direction of stretching (drawing). In this application, machine direction (MD) refers to the running direction ($S_x$) of the film during manufacturing, as shown for example in FIG. 2. The degree of orientation of the polymer chains depends on the drawing ratio of the film. In other words, the polymer chains in the film stretched with a higher draw ratio are more oriented when compared to the films stretched with a lower draw ratio. The orientation, like orientation direction and ratio, may have effect on properties of the film, and/or the label comprising the film. The stretching of the film and orientation of the polymer chains may be observed microscopically. Further, the orientation is detectable e.g. from the mechanical properties of the films, such as values of modulus and/or tensile strength.

A ratio of total film thickness before and after stretching is called a "stretch ratio" or "draw ratio" (DR). It may also be referred to as an orientation ratio or stretching ratio. In other words, stretch ratio is a ratio of non-oriented (undrawn) film thickness to the oriented (stretched) film thickness. The non-oriented film thickness is the thickness after extrusion and subsequent chilling of the film. When stretching the film, the thickness of the film may diminish in the same ratio as the film stretches or elongates. For example, a film having thickness of 100 micrometers before uniaxial orientation is stretched by a stretch ratio of 5. After the uniaxial orientation the film may have a fivefold diminished thickness of 20 micrometers. Thus, the stretch ratio (orientation ratio) of the film is 5.

A face film 1 of a heat shrink label may have a monolayer structure. Alternatively, a face film 1 may have a multilayer structure comprising two or more layers. A multilayer face film may have a three layer structure. Alternatively, a multilayer face film may comprise five or even more layers. Preferably, a multilayer face film includes a core layer and equal number of skin layers on both sides of the core layer. For example, a five layer structure comprises a core layer and two skin layers on both sides of the core. For example, a multilayer structure may comprise tie-layers. It is also possible that a multilayer structure includes several core layers.

Referring to FIG. 2, a multilayer face film has a three layer structure. In the three layer structure, a core layer 4 is an intermediate layer. Skin layers 2,6 may be adjoined to the core layer 4. The first skin layer 2 and the second skin layer 6 may also be referred to as a front surface layer and a back surface layer, respectively. The front surface layer may be an outermost layer of the multilayer structure when labelled to a surface of an item. However, the front surface may further be over coated i.e. over-vanished. For example, in order to protect the printed graphics. The back surface layer may be the layer adjacent to a surface of an item. In an example, at least one of the back surface layer and the front surface layer comprises graphics, such as printed information or decoration. Further, the surface layer(s) comprising graphics may be over-coated, for example over-vanished in order to protect the graphics.

Preferably a multilayer face film has a symmetric structure. For example, symmetric three layer face film comprises identical, or nearly identical skin layers on opposite sides of the core layer. Symmetric structure may have effect on quality of the shrunk face film and a shrunk label comprising said face film. For example, wrinkles and curling of the face film may be avoided.

Alternatively, a multilayer face film may be asymmetrical. For example, one skin layer may have more or less additives, e.g. anti-block or slip-agent, than the other skin layer. A face film structure may also comprise additional layers, such as tie layer(s) or protective layer(s). A multilayer face film may also have asymmetry with respect to the skin layer thickness. In other words, there might be some thickness difference between the skin layers, for example in a three layer structure comprising two skin layers the skin layers may have different thickness. The multilayer structure may be laminated or coextruded.

A core layer 4 may form major portion of a multilayer film structure. The core layer may be thicker than a first skin layer and a second skin layer. For example, the core may form 60%, 70% or 80% of the total thickness of the multilayer structure. In an example, a three layer film has a construction 20%/60%/20% for first skin/core/second skin, respectively. In an example, a three layer film has a construction 15%/70%/15% for first skin/core/second skin, respectively. In an example, a three layer film has a construction 10%/80%/10% for first skin/core/second skin, respectively. Alternatively, the core may have thickness of 40% of the total thickness of the multilayer film. In a three layer symmetric film, the core layer having thickness of 40% of the total thickness of the film still forms major portion of the film, since the skin surfaces may have thickness of up to 30% of the label thickness each. Thickness of the core layer may be from 15 to 50 microns, or from 20 to 50 microns, preferably around 30 or 25 microns. Thickness of the skin layers may be 40% of the total thickness of the multilayer structure. Alternatively, thickness of the skin layers may be 60% of the total thickness. A thickness of a skin layer may be less than 20 microns, preferably around 10 or 7.5 microns or less. An overall thickness of a multilayer film may be from 20 to 70 microns or from 25 to 60 microns, preferably around 50 microns, around 40 microns, or around 30 microns or less, for example 20 microns.

Preferably a multilayer film has uniform overall thickness. Uniform thickness refers to a homogeneous thickness of the film, wherein a thickness variation along the film is small. For example in a film area of 100 mm*100 mm variation of the film thickness is less than ±10%, preferably between ±0.1 and ±5.0%. Uniform thickness of the film provides better quality labels, for example, labels having good visual appearance. Uniform film thickness may have effect on the register control and image quality of the printing.

Figure 7:
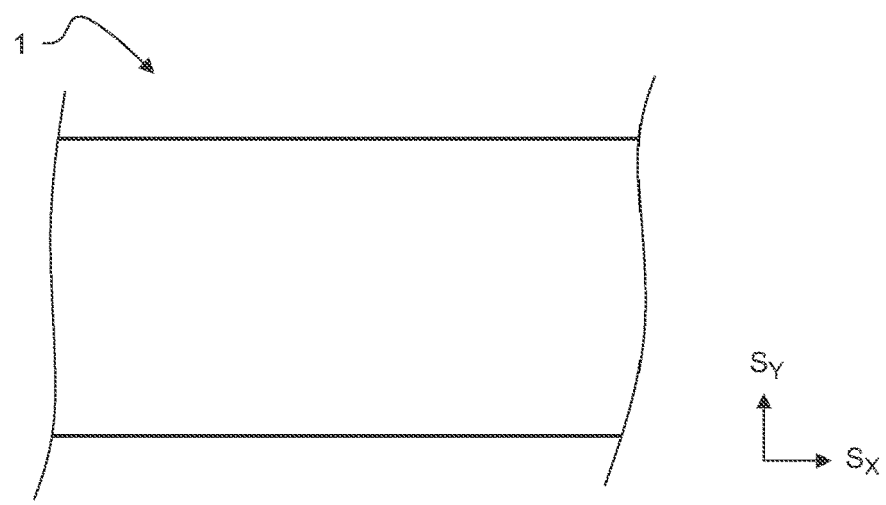
FIGS. 7a-c show an example of a method for seaming of a shrink film so as to provide a shrink label.
Figure 7:
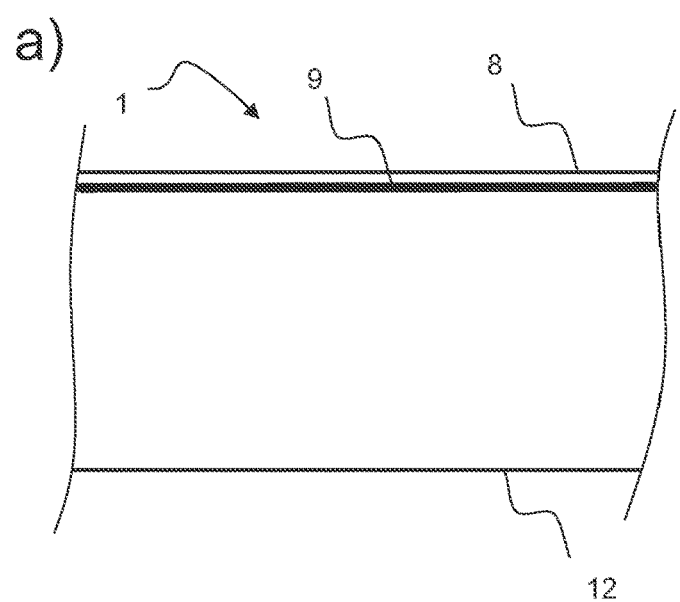
Figure 7:
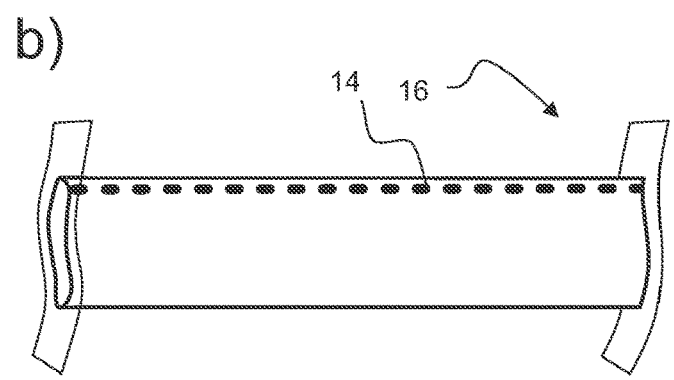

According to an embodiment, a shrink label is a shrink sleeve label. The shrink sleeve label is in a form of tubular sleeve comprising a face film 1 which is oriented uniaxially in a transverse direction ($S_y$). Typically, the face film 1 has already been provided its visual appearance at this phase by printing and/or other methods adding the information and other visual content onto the material. Referring to FIGS. 7a-c a shrink sleeve label 16 is formed by seaming a first longitudinal edge 8 and a second longitudinal edge 12 of the face film 1 extending parallel to a machine direction of the face film ($S_x$). In other words, the face film is rolled around the axis extending in the machine direction ($S_x$) of the face film and the seam 14 is formed between the overlapping longitudinal edges 8,12 of the face film 1. The seam extends perpendicular to the uniaxial orientation direction of the face film. In other words, TDO sleeve is formed off-line via forming a tube of the film so that the machine directional ($S_x$) edges of the web are brought together with a slight overlap and seamed from this overlapping area using a sufficient amount of suitable solvent. Such a preformed sleeve tube may be further rolled into a roll and provided for separate labelling process. From this roll of preformed sleeve tube, desired lengths are cut for shrink sleeve labels, which are further transferred on the container to be labelled. With shrink sleeve labels it is possible to provide 360° C. decoration for the item.

Figure 3:
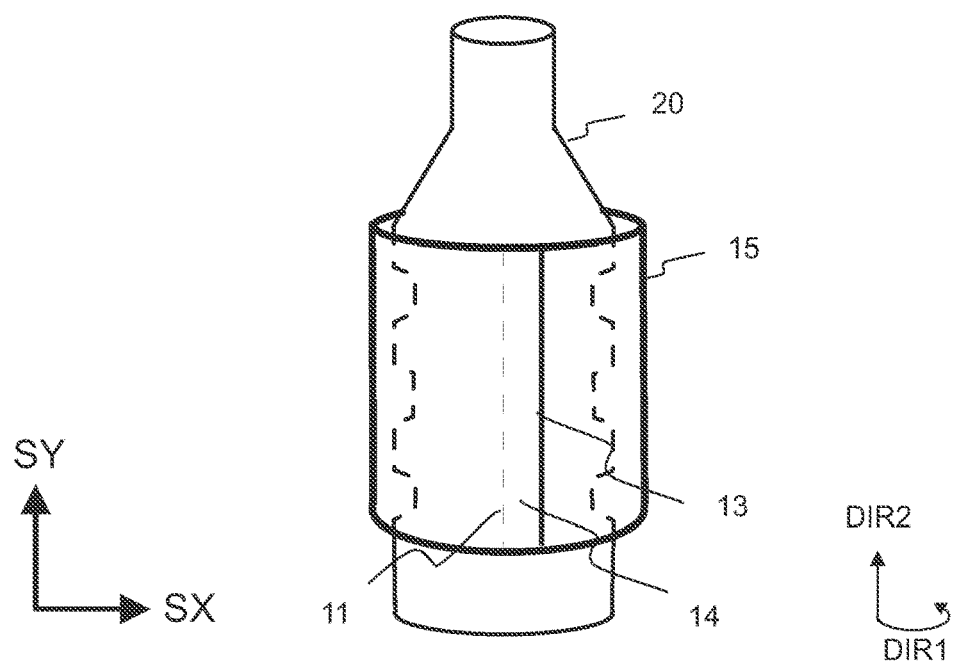
FIG. 3 shows an example of a shrink label around an article (before shrinking)
Figure 4:
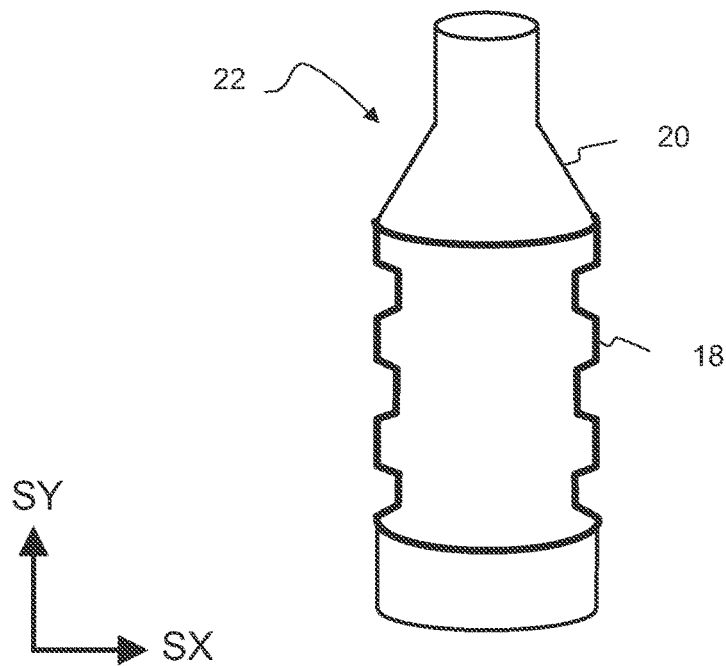
FIG. 4 shows a shrink label fitted on a surface of an article i.e. labeled article (after shrinking)

According to another embodiment, a shrink label is a roll-fed shrink film label comprising a face film 1 which is oriented uniaxially in a machine direction ($S_x$). Referring to FIG. 3 a roll fed shrink film label 15 is formed on-line around an article to be labelled or around a mandrel by seaming a leading edge 11 and a trailing edge 13 of the face film. In other words, the face film is rolled around the axis extending in the transverse direction ($S_y$) of the face film. Preferably, orientation direction $S_x$ of the face film extends circumferentially around the item 20 in direction DIR1. With roll-fed shrink film labels it is possible to provide 360° C. decoration for the item. A label comprises a seam 14 between the overlapping leading edge 11 and trailing edge 13 of the face film. The seam extends perpendicular to the uniaxial orientation direction of the face film. If the label is formed around a mandrel it is further transferred to an article to be labelled. Again, typically the face film 1 has been provided its visual appearance and information during earlier converting steps. The shrink film label 15 is able to shrink in the direction DIR 1 during application of external energy, such as heat. FIG. 4 shows a shrunk label around an item 20.

In both above presented embodiments in the seam area, wherein the first longitudinal edge 8 and the second longitudinal edge 12 or the leading edge 11 and the trailing edge 13 of the face film are overlapping, the opposite surfaces, such as a first skin layer and a second skin layer of the face film, are adjacent to each other. In other words, the seam area 14, wherein the opposite face film surfaces are contacting each other and subsequently bonding to each other so as to form the seam, does not contain any additional layers, such as printing or top coating layer(s). The seam 14 may comprise an adhesive layer, such as a hot melt or UV-curable adhesive. Alternatively, it may comprise solvent dissolving the film materials and thus provide a joint. The adhesive may be provided as a continuous strip or separate adhesive patterns. Alternatively, the seaming may be performed using other methods such as laser welding, heat sealing, or ultrasonic bonding.

Materials for Shrink Labels

According to an embodiment, a face film has a structure comprising multiple layers. A face film may have a three layer structure comprising a first skin layer 2, a core layer 4 and a second skin layer 6. Alternatively a multilayer face film may comprise five or more layers. Multilayer film structure comprises at least two outer skin layers. First outer skin layer also referred to as a first skin layer may be a topmost layer of the label structure. Second outer skin layer also referred to as a second skin may be an undermost layer of the label structure. At least one of the first skin layer and the second skin layer may comprise printing.

A multilayer face film structure may comprise or consist of layers having different compositions. For example, skin layer(s) may have different composition when compared to the composition of the core layer. Also first and second skin layers may have different compositions. Alternatively, the first and second skin layers may have equal compositions.

Skin Layer(s)

According to an embodiment, a first skin layer and a second skin layer include olefin polymer(s). Olefin polymer may be acyclic, such as polyethylene (PE). Polyethylene polymer may be at least one of the following: low density polyethylene (LDPE), medium density polyethylene (MDPE), and linear low density polyethylene (LLDPE). Polyethylene polymer may be a copolymer of ethylene and 1-octene or a copolymer of ethylene and hexene. Polyethylene polymers may be Ziegler-Natta catalysed. Alternatively they may be metallocene-catalysed. Density of polyethylene polymer may be between 0.91 and 0.94 g/cm$^3$, preferably around 0.915-0.925 g/cm$^3$, when measured according to standard ASTM D792. Melt Index may be between 0.5 and 25 g/10 min, preferably between 1 and 10 g/10 min, and most preferably between 1 and 6 g/10 min, when measured at 190° C./2.16 kg according to standard ISO 1133. In addition, the first skin layer and the second skin layer may comprise at least two cyclic polymers. The at least two cyclic polymers may comprise cyclic olefin copolymer(s) (COC), cyclic block copolymer(s) (CBC), cyclic olefin polymer(s) (COP), or any combination thereof.

According to an example, skin layer(s) comprise linear low density polyethylene (LLDPE). LLDPE may be Ziegler-Natta catalyst based. For example, LLDPE may be a copolymer of ethylene and 1-octene. Alternatively, LLDPE may be metallocene-catalysed. For example, ethylene-hexene copolymer.

In an example, LLDPE has density 0.935 g/cm$^3$, when measured according to standard ASTM D1505. Melt index may be 2.6 g/10 min, when measured at 190° C./2.16 kg according to standard ASTM D1238.

In an example, LLDPE has density 0.917 g/cm$^3$, when measured according to standard ASTM D792. Melt index may be 2.3 g/10 min, when measured at 190° C./2.16 kg according to standard ISO 1133.

In an example, polyethylene has density 0.916 g/cm$^3$, when measured according to standard ASTM D792. Melt index may be 4 g/10 min, when measured at 190° C./2.16 kg according to standard ISO 1133.

In an example, LLDPE is a copolymer of an ethylene and 1-octene having density 0.916 g/cm$^3$, when measured according to standard ASTM D792. Melt index may be 2.0 g/10 min, when measured at 190° C./2.16 kg according to standard ISO 1133.

In an example, metallocene based LLDPE with hexene as comonomer has density 0.917 g/cm$^3$, when measured according to standard ISO 1183. Melt index (melt flow rate) may be 1.0 g/10 min, when measured at 190° C./2.16 kg according to standard ISO 1133.

In an example, metallocene based polyethylene with hexene as comonomer has density 0.934 g/cm$^3$, when measured according to standard ISO 1183. Melt index (melt flow rate) may be 3.1 g/10 min, when measured at 190° C./2.16 kg according to standard ISO 1133.

In an example, polyethylene is metallocene catalysed ethylene-hexene copolymer having density 0.918 g/cm$^3$, when measured according to standard ISO 1183. Melt index (melt flow rate) may be 2.0 g/10 min, when measured at 190° C./2.16 kg according to standard ISO 1133. Alternatively, melt index may be 2.0 g/10 min, when measured according to standard ASTM D1238 at 190° C./2.16 kg. Alternatively, melt index may be 3.5 g/10 min, when measured according to standard ASTM D1238 at 190° C./2.16 kg.

According to an example, skin layer(s) comprise metallocene based low density polyethylene (LDPE) with hexene as comonomer. In an example, metallocene based LDPE has density 0.918 g/cm$^3$, when measured according to standard ISO 1183. Melt index (melt flow rate) may be 2.0 g/10 min, when measured at 190° C./2.16 kg according to standard ISO 1133.

According to an example, skin layer(s) comprise metallocene based medium density polyethylene (MDPE) with hexene as comonomer. In an example, MDPE has density 0.934 g/cm$^3$, when measured according to standard ISO 1183. Melt index (melt flow rate) may be 0.9 g/10 min, when measured at 190° C./2.16 kg according to standard ISO 1133.

Total amount of polyethylene(s), including at least one of the following LDPE, LLDPE and MDPE, may be at most 30 wt. %, or at most 20 wt. %, or at most 10 wt. % of the total weight of the skin layer. As an example, minimum amount of polyethylene(s) may be 2, 5 or 10 wt. %. An amount of polyethylene(s) may be between 2 and 30 wt. %, between 5 and 20 wt. %, between 5 and 10 wt. %, or between 10 and 20 wt. %.

For example, an amount of linear low density polyethylene may be at most 30 wt. %, or at most 20 wt. %, or at most 10 wt. % of the total weight of the skin layer. As an example, minimum amount of LLDPE may be 2, 5 or 10 wt. %. An amount of LLDPE may be between 2 and 30 wt. %, between 5 and 20 wt. %, between 5 and 10 wt. %, or between 10 and 20 wt. %.

LLDPE may have effect on visual appearance of the film. It may have effect on reducing and/or avoiding the finger marking tendency of the film. LLDPE may further have an effect on providing good interlayer attachment for multilayer films. Also MDPE and LDPE may have effect on reducing and/or avoiding the finger marking tendency of the film. They may also have effect on interlayer adhesion of the multilayer face film.

In addition, at least one of the skin layers further includes at least two cyclic polymers. The at least two cyclic polymers may comprise: cyclic olefin copolymer (COC), cyclic block copolymer (CBC), cyclic olefin polymer (COP), or any combination thereof. Preferably, e.g. in a three layer face film structure, both a first skin layer and a second skin layer contain at least two of the following cyclic polymers: cyclic olefin copolymer, cyclic block copolymer, and cyclic olefin polymer, or any combination thereof. The at least two cyclic polymers comprise different glass transition temperatures between 30 and 100° C. and the difference between the glass transition temperatures is between 5 and 60° C. The difference in the glass transition temperature of the cyclic polymers may be at least 5° C., preferably at least 10° C. The difference in the glass transition temperature of the cyclic polymers may be at most 50° C., or at most 60° C. Cyclic olefin copolymers, cyclic block copolymers, and cyclic olefin polymers may have effect on clarity of the face film and a label produced thereof.

In an example, the skin layer(s) may comprise at least two cyclic olefin copolymers comprising different glass transition temperatures in range of 30-100° C. and the difference between the glass transition temperatures being between 5 and 60° C.

In an example, the skin layer(s) may comprise at least two cyclic olefin copolymers comprising different glass transition temperatures in range of 50-90° C. and the difference between the glass transition temperatures being at most 40° C., preferably at most 30° C. The difference in the glass transition temperature of the first cyclic olefin copolymer and the second cyclic olefin copolymer may be at least 5° C., preferably at least 10° C. The glass transition temperature of the first cyclic olefin copolymer may be below 70° C. and the glass transition temperature of the second cyclic olefin is above 70° C.

In an example, the skin layer(s) may comprise at least two cyclic block copolymers, comprising different glass transition temperatures in range of 30-100° C. and the difference between the glass transition temperatures being between 5 and 60° C.

In an example, the skin layer(s) may comprise at least two cyclic olefin polymers, comprising different glass transition temperatures in range of 30-100° C. and the difference between the glass transition temperatures being between 5 and 60° C.

In an example, the skin layer(s) may comprise at least cyclic olefin copolymer and cyclic block copolymer, comprising different glass transition temperatures in range of 30-100° C. and the difference between the glass transition temperatures being between 5 and 60° C.

In an example, the skin layer(s) may comprise at least cyclic olefin copolymer and cyclic olefin polymer, comprising different glass transition temperatures in range of 30-100° C. and the difference between the glass transition temperatures being between 5 and 60° C.

In an example, the skin layer(s) may comprise at least cyclic block copolymer and cyclic olefin polymer, comprising different glass transition temperatures in range of 30-100° C. and the difference between the glass transition temperatures being between 5 and 60° C.

Total amount of the cyclic polymers: cyclic olefin copolymer(s), cyclic block copolymer(s), cyclic olefin polymer(s), or any combination thereof, in the skin layer(s) may be at least 50 wt. %, or at least 60 wt. %. Total amount of cyclic polymer(s) may be up to 98 wt. %, or at most 90 wt. %. For example, an amount of cyclic polymer(s) may be between 50 and 98 wt. %, between 60 and 95 wt. %, or between 70 and 90 wt. %.

The cyclic olefin copolymer contains polymerized units derived from at least one cyclic olefin and at least one acyclic olefin. COC may have linear and amorphous structure. COCs may be produced by chain copolymerization of cyclic monomers with ethene. The cyclic olefin may comprise at least 4 carbon atoms and a unsaturated site for coordinated polymerization with the acyclic olefin. The cyclic olefin may comprise an unsubstituted or substituted ring. The acyclic olefin may be an alpha olefin having two or more carbon atoms. Cyclic olefin copolymers may be based on cyclic monomers, such as norbornene and/or tetracyclododecene. Cyclic monomer(s) may be chain copolymerized with ethene (ethylene). For example, cyclic olefin copolymer may comprise monomers of norbornene and ethene. Norbornene content in COC may be between 60 and 70 wt. %. Alternatively, cyclic olefin copolymer may comprise monomers of tetracyclododecene and ethene. Cyclic olefin copolymer may also consists of monomers of norbornene, tetracyclododecene and ethene. Alternatively, cyclic olefin monomer may be at least one of the following: cyclobutene, cyclopentene, cyclooctene, 5-methylnorbornene, 3-methylnorbornene, ethylnorbornene, phenylnorbornene, dimethylnorbornene, diethylnorbornene, dicyclopentadiene, methyltetracyclododecene, 6-methylnorbornene, 6-ethylnorbornene, 6-n-butylnorbornene, 5-propylnorbornene, 1-methylnorbornene, 7-methylnorbornene, 5,6-dimethylnorbornene, 5-phenylnorbornene, 5-benzylicnorbornene, 8-methyltetracyclo-3-dodecene, 8-ethyltetracyclo-3-dodecene, 8-hexyltetracyclo-3-dodecene, 2,10-dimethyltetracyclo-3-dodecene and 5,10-dimethyltetracyclo-3-dodecene.

According to an example, skin layer(s) comprise cyclic olefin copolymer having density of 980 kg/m$^3$, when measured according to standard ISO 1183. COC may have linear and amorphous structure. Melt volume rate may be 4 cm$^3$/10 min, when measured according to standard ISO 1133 at 230° C. with test load of 2.16 kg. Melt volume rate may be 8 cm$^3$/10 min, when measured according to standard ISO 1133 at 260° C. with test load of 2.16 kg. Melt volume rate may be 1 cm$^3$/10 min, when measured according to standard ISO 1133 at 190° C. with test load of 2.16 kg. Glass transition temperature may be 33 degrees C., when measured according to standard ISO 11357 (10° C./min).

According to an example, skin layer(s) comprise cyclic olefin copolymer having density of 940 kg/m$^3$, when measured according to standard ISO 1183. COC may have linear and amorphous structure. Melt flow rate may be 2.7 g/10 min, when measured at 190 degrees C. with test load of 2.16 kg Melt flow rate may be 11 g/10 min, when measured at 260 degrees C. with test load of 2.16 kg. Melt temperature may be ($T_m$) may be 183° F. (83.9° C.), when measured according to standard ISO 11357 (10° C./min). Vicat softening temperature A50 (50° C./4 10N) may be 147° F. (63.9° C.), when measured according to standard ISO 306.

It has been surprisingly found, that when at least two cyclic olefin copolymers are used in combination then the coefficient of friction of the film achieved is at a very low level and fully in accordance with the requirements of the labelling machines and techniques used. The at least two cyclic olefin copolymers may be selected from the following COCs comprising glass transition temperature of 33° C., 65° C., 70° C. or 78° C. Preferably, the two cyclic olefin copolymers have the difference at glass transition temperatures between 5 and 60° C. Low coefficient of friction may also have effect on avoiding wrinkling/creasing of the labels during labelling process.

In addition this COC grade with $T_g$ of 33° C. may have effect on moving the shrinkage curve to the left. In other words, it may give higher shrinkage of the film at a lower temperature allowing good shrinkage of the film in steam tunnel. It may further have effect on providing lower total density for the film prior to and after printing. Low density less than 0.99 g/cm$^3$ allows the film float in the alkali washing process. Further, as the density of the film is lower, the yield, in other words sqm/kg, will be higher and therefore the cost/sqm will be reduced.

At least some/all of the above mentioned effects may also be achieved when using cyclic olefin copolymer comprising Vicat softening temperature A50 (50° C./4 10N) of 147° F., when measured according to standard ISO 306.

The skin layer(s) may further comprise other cyclic olefin polymer(s) as disclosed in the following:

According to an example, skin layer(s) comprise cyclic olefin copolymer having density of 1.02 g/cm$^3$, when measured according to standard ASTM D792. Melt volume rate may be 15 g/10 min, when measured according to standard ASTM D1238 at 260° C. with test load of 2.16 kg. Glass transition temperature may be 70 degrees C.

According to an example, cyclic olefin copolymer may have melt flow rate 6.0 cm$^3$/10 min, when tested according to standard ISO 1133 at 230° C. with test load of 2.16 kg. Density may be 1010 kg/m$^3$, when measured according to standard ISO 1183. Glass transition temperature may be 65° C., when measured according to standard ISO 11357-1, -2,-3 with heating rate of 10° C./min.

According to an example, cyclic olefin copolymer may have melt flow rate 12 cm$^3$/10 min, when tested according to standard ISO 1133 at 230° C. with test load of 2.16 kg. Density may be 1010 kg/m$^3$, when measured according to standard ISO 1183. Glass transition temperature may be 78° C., when measured according to standard ISO 11357-1, -2,-3 with heating rate of 10° C./min.

According to an example, skin layer(s) comprise cyclic olefin polymer(s). Cyclic olefin polymer may be produced by ring-opening metathesis polymerization of single type of cyclic monomers followed by hydrogenation. According to an example, melt index of a cyclic olefin polymer, also referred to as cyclo-olefin polymer, may be between 11 and 25 g/10 min at 230° C., for example between 15 and 25 g/10 min, or between 11 and 17 g/10 min. Light transmittance may be 90%.

According to an example, skin layer(s) comprise cyclic block copolymer(s). Cyclic block copolymer is a polymer comprising two or more chemically distinct regions or segments, referred to as blocks. Blocks may be joined in a linear manner. Cyclic bloc copolymer may comprise blocks of hydrogenated polystyrene, polycyclohexylethylene (PCHE), and ethylene-butene (EB). Alternatively it may comprise blocks of polycyclohexylethylene (PCHE) and ethylene-propylene (EP). Specific gravity of cyclic block copolymer may be between 0.928 and 0.938 kg/dm$^3$. Melt flow rate may be 3 g/10 min at 300° C./1.2 kg, or 15 g/10 min at 280° C./2.16 kg or 76 g/10 min at 250° C./2.16 kg.

Further, skin layer(s) may contain additives, such as inorganic fillers, pigments, antioxidants, ultraviolet absorbers, anti-blocking agents, slip additives, antistatic additives, cavitating agents. For example, a first skin layer may comprise anti-blocking agent. An amount of anti-blocking agent may be between 0.5 and 5 wt. %, preferably between 1 and 3 wt. % or between 2 and 3 wt. %.

For example, the skin layer(s) comprise at least two cyclic polymers, a first cyclic polymer and a second cyclic polymer. Said two cyclic polymers are different from each other and may have, for example, different glass transition temperatures. A glass transition temperature of the at least two cyclic polymers may be between 30 and 100° C. A difference in the glass transition temperature of the first cyclic polymer and the second cyclic polymer may be at most 60° C., or at most 40° C. The difference in the glass transition temperature of the first cyclic polymer and the second cyclic polymer may be at least 5° C., preferably at least 10° C. In an example, a difference in the glass transition temperature is between 5 and 60° C. In an example, the first cyclic polymer has the glass transition temperature below 70° C. and the second cyclic polymer has the glass transition temperature above 70° C.

According to an embodiment, a first skin layer and a second skin layer comprise a first cyclic olefin copolymer $COC_1$ and a second cyclic olefin copolymer $COC_2$. The first cyclic olefin is different from the second cyclic olefin having at least different glass transition temperatures ($T_g$).

Glass transition temperatures of the first cyclic olefin copolymer and the second cyclic olefin copolymer are between 30 and 100° C. A difference in the glass transition temperature of the first cyclic olefin copolymer and the second cyclic olefin copolymer may be at most 60° C. The difference in the glass transition temperature of the first cyclic olefin copolymer and the second cyclic olefin copolymer may be at least 5° C., preferably at least 10° C. The glass transition temperature of the first cyclic olefin copolymer may be below 70° C. The glass transition temperature of the second cyclic olefin copolymer may above 70° C.

According to an embodiment, a first skin layer and a second skin layer comprise a first cyclic olefin copolymer $COC_1$ and a second cyclic olefin copolymer $COC_2$. Preferably, the first cyclic olefin is different from the second cyclic olefin. Both cyclic olefin copolymers may comprise norbornene copolymerized with ethene. Norbornene content of COCs may be different. Norbornene content in COCs may be between 60 and 70 wt. %. In an example, $COC_1$ has norbornene content between 61 and 63 wt. %. In an example, $COC_2$ has norbornene content between 64 and 66 wt. %.

A glass transition temperature of the first cyclic olefin copolymer and a glass transition temperature of the second cyclic olefin copolymer is between 50 and 100° C. A difference in the glass transition temperature of the first cyclic olefin copolymer and in the glass transition temperature the second cyclic olefin copolymer may be at most 40° C., preferably at most 30° C. The difference in the glass transition temperature of the first cyclic olefin copolymer and the second cyclic olefin copolymer may be at least 5° C., preferably at least 10° C.

The glass transition temperature of the first cyclic olefin copolymer may be below 70° C. The glass transition temperature of the second cyclic olefin may be above 70° C. The first cyclic olefin copolymer $COC_1$ may have glass transition temperature of 65° C., when measured according to standard ISO 11357-1, -2,-3 with heating rate of 10° C./min. The second cyclic olefin copolymer $COC_2$ may have a glass transition temperature of 78° C., when measured according to standard ISO 11357-1, -2,-3 with heating rate of 10° C./min.

Melt volume rate (MVR) of the first cyclic olefin copolymer $COC_1$ may be 6.0 cm$^3$/10 min, when tested according to standard ISO 1133 at 230° C. with test load of 2.16 kg. Melt volume rate (MVR) of the second cyclic olefin copolymer may be 12 cm$^3$/10 min, when tested according to standard ISO 1133 at 230° C. with test load of 2.16 kg. Density of $COC_1$ and $COC_2$ may be 1010 kg/m$^3$, when measured according to standard ISO 1183.

Total amount of cyclic olefin copolymer(s) in skin layer(s) may be at least 50 wt. %, or at least 60 wt. %. Total amount of cyclic olefin copolymer(s) may be up to 98 wt. %, or at most 90 wt. %. For example, an amount of cyclic olefin copolymer(s) may be between 50 and 98 wt. %, between 60 and 95 wt. %, or between 70 and 90 wt. %.

An amount of $COC_1$ may be between 44 and 77 wt. %, between 50 and 77 wt. %, or between 65 and 75 wt. %.

An amount of $COC_2$ may be between 10 and 44 wt. %, between 15 and 35 wt. %, or between 15 and 25 wt. %.

For example, a ratio of the first cyclic olefin copolymer to the second cyclic olefin copolymer $COC_1/COC_2$ may be between 1 and 8, between 2 and 6, or between 3 and 5.

$COC_2$ may have higher cyclic olefin monomer content (e.g. norbornene content) when compared to $COC_1$. Higher cyclic olefin monomer content may have effect on providing better resistance against solvents. It may further have effect on avoiding whitening of the film during seaming and heat shrinking. It may also have effect on enabling clear and flat seam for heat shrunk films and labels produced thereof.

$COC_1$ may have effect on seam forming ability of the film.

Core Layer

A core layer of the multilayer face film may comprise polyolefins, such as polypropylene and/or polyethylene. The core layer may be based on polypropylene (PP). Alternatively, it may be based on polyethylene (PE). A core layer may comprise, for example, linear low density polyethylene (LLDPE). In an example, a core layer may comprise or consist of polypropylene and polyethylene, such as MDPE, LDPE or LLDPE.

According to an embodiment, a core layer comprises at least one terpolymer. Propylene terpolymer(s) refers to copolymer(s) comprising three distinct monomers, of which one is propylene. Other monomers may be ethylene, 1-butene, 1-hexene or 1-octene. Terpolymer of the core layer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene. An amount of terpolymer(s) may be between 20 and 95 wt. %, preferably between 40 and 90 wt. %, more preferably between 50 and 80 wt. %. For example 50, 55, 60, 65, 70, 75 or 80 wt. %.

Terpolymer(s) may have a density around 0.90 g/cm$^3$, for example 0.900 or 0.902 g/cm$^3$. MFR (230 deg C./2.16 kg)

may be from 0.5 to 10 g/10 min. Terpolymer(s) may have effect on the orientation behaviour of the film. Terpolymer(s) may reduce the softening point of the film thus improving the stretching of the film. For example, films comprising terpolymer(s) may be stretched at a lower temperature. In addition, higher orientation ratios may be achieved, which may have effect on the shrinkage potential of the film. In a core layer of the film terpolymer(s) may have an effect on increasing the strength of the film. In addition, terpolymer(s) may have an effect on providing more stability for the film, which is advantageous during orientation process e.g. in avoiding the film tearing away from the grippers holding the film, particularly for orientation in the transverse direction.

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 137 degrees C. (ISO 11357-3).

In an example, propylene terpolymer comprises density of 0.90 g/cm$^3$, when measured according to standard ISO 1183. Melt flow rate may be 6 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 0.9 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 7.5 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 127 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 128 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 130 degrees C. (ISO 11357-3).

In addition, the core layer may contain polyolefin plastomer and/or polyolefin elastomer. An amount of polyolefin plastomer and/or polyolefin elastomer may be between 2 and 50 wt. %, preferably between 5 and 40 wt. %, and more preferably between 10 and 40 wt. %. Propylene elastomer(s) and propylene plastomer(s) may be propylene-ethylene copolymers produced with a special catalyst and technology. A plastomer is a polymer that softens when heated. It hardens when cooled, but remains flexible. An elastomer is elastic polymer resembling natural rubber, returning to its original shape after being stretched or compressed. Propylene plastomers and propylene elastomers have narrow molecular weight distribution (MWD), broad crystallinity distribution and wide melt range.

The core layer may comprise at least one of the following: propylene/ethylene plastomer, ethylene/octene elastomer and ethylene/butene elastomer. In an example, the core layer may contain propylene/ethylene plastomer, ethylene/octene elastomer, ethylene-octene block copolymer and/or ethylene/butene elastomer together with propylene terpolymer(s). An amount of propylene/ethylene plastomer, ethylene/octene elastomer, ethylene-octene block copolymer and/or ethylene/butene elastomer may be between 2 and 50 wt. %, preferably between 5 and 40 wt. %, and more preferably between 10 and 40 wt. %. The core layer may comprise, for example, total amount of 10, 15, 20, 25 or 30 wt. % polyolefin elastomer and/or polyolefin plastomer.

Polyolefin elastomer may have density from 0.85 to 0.91 g/cm$^3$. MFR may be from 1.0 to 10 g/10 min (230 deg C./2, 16 kg).

Ethylene-octene block copolymers may have density between 0.866 and 0.887 g/cm$^3$, when measured according to ASTM D792. Melt index may be between 1 and 5 g/10 min, when measured according to ASTM D1238 (at 2.16 kg, 190° C.). DSC melting temperature may be between 119 and 122° C.

In an example, ethylene-octene block copolymer may have density of 0.877 g/cm$^3$, when measured according to ASTM D792. Melt index may be 5 g/10 min, when measured according to ASTM D1238 (at 2.16 kg, 190° C.). DSC melting temperature may be 122° C.

In an example, ethylene-octene block copolymer may have density of 0.866 g/cm$^3$, when measured according to ASTM D792. Melt index may be 1 g/10 min, when measured according to ASTM D1238 (at 2.16 kg, 190° C.). DSC melting temperature may be 121° C.

In an example, ethylene-octene block copolymer may have density of 0.887 g/cm$^3$, when measured according to ASTM D792. Melt index may be 5 g/10 min, when measured according to ASTM D1238 (at 2.16 kg, 190° C.). DSC melting temperature may be 119° C.

In an example, ethylene-octene block copolymer may have density of 0.866 g/cm$^3$, when measured according to ASTM D792. Melt index may be 5 g/10 min, when measured according to ASTM D1238 (at 2.16 kg, 190° C.). DSC melting temperature may be 119° C.

Ethylene-butene elastomer(s) may have density between 0.862 and 0.880 g/cm$^3$, when measured according to ASTM D792. Melt index may be between 0.8 and 5 g/10 min, when measured according to ASTM 1238 (at 2.16 kg, 190° C.). Mooney viscosity may be between 7 and 24 MU, when measured according to standard ASTM 1646 (ML 1+4 at 121° C.). Total crystallinity may be between 12 and 19%. DSC melting peak may be between 34 and 76° C., when measured at heating rate of 10° C./min. Glass transition temperature may be may be −58 and −42° C. (DSC inflection point).

In an example, ethylene-butene elastomer may have density 0.862 g/cm$^3$, when measured according to ASTM D792. Melt index may be 1.2 g/10 min, when measured according to ASTM 1238 (at 2.16 kg, 190° C.). Mooney viscosity may be 19 MU, when measured according to standard ASTM 1646 (ML 1+4 at 121° C.). Total crystallinity may be 12%. DSC melting peak may be 34° C., when measured at heating rate of 10° C./min. Glass transition temperature may be may be −58° C. (DSC inflection point).

In an example, ethylene-butene elastomer may have density 0.862 g/cm$^3$, when measured according to ASTM D792. Melt index may be 3.6 g/10 min, when measured according to ASTM 1238 (at 2.16 kg, 190° C.). Mooney viscosity may be 9 MU, when measured according to standard ASTM 1646

(ML 1+4 at 121° C.). Total crystallinity may be 12%. DSC melting peak may be 40° C., when measured at heating rate of 10° C./min. Glass transition temperature may be may be −56° C. (DSC inflection point).

In an example, ethylene-butene elastomer may have density 0.865 g/cm$^3$, when measured according to ASTM D792. Melt index may be 5 g/10 min, when measured according to ASTM 1238 (at 2.16 kg, 190° C.). Mooney viscosity may be 7 MU, when measured according to standard ASTM 1646 (ML 1+4 at 121° C.). Total crystallinity may be 13%. DSC melting peak may be 35° C., when measured at heating rate of 10° C./min. Glass transition temperature may be may be −53° C. (DSC inflection point).

In an example, ethylene-butene elastomer may have density 0.880 g/cm$^3$, when measured according to ASTM D792. Melt index may be 0.8 g/10 min, when measured according to ASTM 1238 (at 2.16 kg, 190° C.). Mooney viscosity may be 24 MU, when measured according to standard ASTM 1646 (ML 1+4 at 121° C.). Total crystallinity may be 19%. DSC melting peak may be 64° C., when measured at heating rate of 10° C./min. Glass transition temperature may be may be −44° C. (DSC inflection point).

Ethylene-octene elastomer(s) may have density between 0.857 and 0.908 g/cm$^3$, when measured according to ASTM D792. Melt index may be between 0.5 and 18 g/10 min, when measured according to ASTM 1238 (at 2.16 kg, 190° C.). Mooney viscosity may be between 3 and 33 MU, when measured according to standard ASTM 1646 (ML 1+4 at 121° C.). Total crystallinity may be between 13 and 34%. DSC melting peak may be 38 and 104° C., when measured at heating rate of 10° C./min. Glass transition temperature may be may be −58 and −31° C. (DSC inflection point).

In an example, ethylene-octene elastomer may have density 0.857 g/cm$^3$, when measured according to ASTM D792. Melt index may be 1 g/10 min, when measured according to ASTM 1238 (at 2.16 kg, 190° C.). Mooney viscosity may be 25 MU, when measured according to standard ASTM 1646 (ML 1+4 at 121° C.). Total crystallinity may be 13%. DSC melting peak may be 38° C., when measured at heating rate of 10° C./min. Glass transition temperature may be may be −58° C. (DSC inflection point).

In an example, ethylene-octene elastomer may have density 0.863 g/cm$^3$, when measured according to ASTM D792. Melt index may be 0.5 g/10 min, when measured according to ASTM 1238 (at 2.16 kg, 190° C.). Mooney viscosity may be 33 MU, when measured according to standard ASTM 1646 (ML 1+4 at 121° C.). Total crystallinity may be 16%. DSC melting peak may be 56° C., when measured at heating rate of 10° C./min. Glass transition temperature may be may be −55° C. (DSC inflection point).

In an example, ethylene-octene elastomer may have density 0.870 g/cm$^3$, when measured according to ASTM D792. Melt index may be 5 g/10 min, when measured according to ASTM 1238 (at 2.16 kg, 190° C.). Mooney viscosity may be 8 MU, when measured according to standard ASTM 1646 (ML 1+4 at 121° C.). Total crystallinity may be 19%. DSC melting peak may be 59° C., when measured at heating rate of 10° C./min. Glass transition temperature may be may be −53° C. (DSC inflection point).

In an example, ethylene-octene elastomer may have density 0.880 g/cm$^3$, when measured according to ASTM D792. Melt index may be 18 g/10 min, when measured according to ASTM 1238 (at 2.16 kg, 190° C.). Mooney viscosity may be 3 MU, when measured according to standard ASTM 1646 (ML 1+4 at 121° C.). Total crystallinity may be 24%. DSC melting peak may be 76° C., when measured at heating rate of 10° C./min. Glass transition temperature may be may be −50° C. (DSC inflection point).

In an example, a propylene-ethylene copolymer plastomer/elastomer comprises density between 0.863 and 0.888 g/cm$^3$, when measured according to standard ASTM D792. Melt flow rate may be between 2 and 8 dg/min, when measured according to standard ASTM D1238 at 230 degrees C., 2.16 kg. Total crystallinity may be between 14 and 44%. Glass transition temperature may be between −33 and −17 degrees C.

In an example, olefinic elastomer is produced by using metallocene catalyst technology and the ethylene content being 11 wt. %. Density may be 0.873 g/cm$^3$, when measured according to standard ASTM D1501. Melt flow rate may be between 8 g/10 min. Melt index may be 3.6 g/10 min, when measured according to standard ASTM D 1238 at 190 degrees C., 2.16 kg.

In an example, olefinic elastomer comprises isotactic propylene repeat units with random ethylene distribution and the ethylene content being 11 wt. %. Density may be 0.874 g/cm$^3$, when measured according to standard ASTM D1501. Melt flow rate may be between 3 g/10 min. Melt index may be 1.1 g/10 min, when measured according to standard ASTM D 1238 at 190 degrees C., 2.16 kg.

In an example, olefinic elastomer is produced by using metallocene catalyst technology and the ethylene content being 15 wt. %. Density may be 0.863 g/cm$^3$, when measured according to standard ASTM D1501. Melt flow rate may be between 20 g/10 min. Melt index may be 9.1 g/10 min, when measured according to standard ASTM D 1238 at 190 degrees C., 2.16 kg.

Polyolefin elastomer(s) and/or polyolefin plastomer(s) may have a positive effect on the ability of the film to be stretched (oriented) and thus on the shrinkage potential of the film.

The core layer may further include one of the following: a polybutene-ethylene copolymer or a heterophasic propylene-ethylene copolymer. In an example, the core layer includes propylene/ethylene plastomer, ethylene/octene elastomer, ethylene-octene block copolymer and/or ethylene/butene elastomer; and further polybutene-ethylene copolymer. Polybutene-ethylene copolymer may be random copolymer of 1-butylene (1-butene) with ethene. An amount of polyolefin polybutene-ethylene copolymer may be from 0 to 30 wt. %, preferably from 0 to 20 wt. %, and more preferably from 0 to 10 wt. %. In an example, the core layer includes propylene/ethylene plastomer, ethylene/octene elastomer, ethylene-octene block copolymer and/or ethylene/butene elastomer; and further heterophasic propylene-ethylene copolymer. An amount of heterophasic propylene-ethylene copolymer may be from 0 to 30 wt. %, preferably from 0 to 20 wt. %, and more preferably from 0 to 10 wt. %. Alternative amounts for polybutene-ethylene copolymer and heterophasic propylene-ethylene copolymer may be between 0 and 50 wt. %, or between 10 and 50 wt. %, preferably between 30 and 50 wt. %.

Heterophasic propylene-ethylene copolymer(s) may have melt flow rate MFR (at 230° C./2.16 kg) between 0.6 and 27 g/10 min, when measured according to ISO 1133. Density may be between 880 and 905 kg/m$^3$. Melting temperature may be between 140 and 170° C., when measured according to standard ISO 11357-3.

In an example, heterophasic propylene-ethylene copolymer may have melt flow rate MFR (at 230° C./2.16 kg) of 0.8 g/10 min, when measured according to ISO 1133. Density may be of 905 kg/m$^3$. A XS content may be of 28 wt. %, referring to xylene soluble species in the propylene copolymer. Ethylene content may be 15.5 wt. %. Melting temperature may be 140° C., when measured according to standard ISO 11357-3.

In an example heterophasic propylene-ethylene copolymer may have melt flow rate MFR (at 230° C./2.16 kg) of 0.85 g/10 min, when measured according to ISO 1133. Melting temperature may be 166° C., when measured according to standard ISO 3146.

In an example heterophasic propylene-ethylene copolymer may have melt flow rate MFR (at 230° C./2.16 kg) of 3.0 g/10 min, when measured according to ISO 1133. Melting temperature may be 168° C., when measured according to standard ISO 11357-3.

Preferably the heterophasic propylene-ethylene copolymers presented in the following may be used for the core layer:

In an example heterophasic propylene-ethylene copolymer may have density of 0.88 g/cm$^3$, when measured according to standard ISO 1183. Melt flow rate MFR (at 230° C./2.16 kg) may be 0.6 g/10 min, when measured according to ISO 1133. Melting temperature may be 140° C., when measured according to standard ISO 11357-3. Vicat softening temperature may be 60° C., when measured according to standard ISO 306 (A50 (50° C./h 10N)).

In an example heterophasic propylene-ethylene copolymer may have melt flow rate MFR (at 230° C./2.16 kg) may be 27 g/10 min, when measured according to ISO 1133. Vicat softening temperature may be 72.8° C., when measured according to standard ISO 306 (A50 (50° C./h 10N)).

In an example heterophasic propylene-ethylene copolymer may have density of 0.89 g/cm$^3$, when measured according to standard ISO 1183. Melt flow rate MFR (at 230° C./2.16 kg) may be 7.5 g/10 min, when measured according to ISO 1133. Vicat softening temperature may be 94° C., when measured according to standard ISO 306 (A50 (50° C./h 10N)).

In an example heterophasic propylene-ethylene copolymer may have density of 0.89 g/cm$^3$, when measured according to standard ISO 1183. Melt flow rate MFR (at 230° C./2.16 kg) may be 9.5 g/10 min, when measured according to ISO 1133. Melting temperature may be 147° C., when measured according to standard ISO 11357-3. Vicat softening temperature may be 112° C., when measured according to standard ISO 306 (A50 (50° C./h 10N)).

In an example heterophasic propylene-ethylene copolymer may have density of 0.89 g/cm$^3$, when measured according to standard ISO 1183. Melt flow rate MFR (at 230° C./2.16 kg) may be 6 g/10 min, when measured according to ISO 1133. Vicat softening temperature may be 89° C., when measured according to standard ISO 306 (A50 (50° C./h 10N)).

Polybutene-ethylene copolymer(s) may have melt flow rate MFR (at 190° C./2.16 kg) between 2.5 and 4 g/10 min, when measured according to standard ISO 1133. Density may be between 0.897 and 0.911 g/cm$^3$ at 20° C., when measured according to standard ISO 1183. Melting temperature may be between 81 and 97° C.

In an example, polybutene-ethylene copolymer may be a random copolymer of butene-1 with low ethylene content. It may have melt flow rate MFR (at 190° C./2.16 kg) of 4 g/10 min. Density may be of 0.911 kg/m$^3$. Melting temperature may be 97° C.

In an example, polybutene-ethylene copolymer may be a random copolymer of butene-1 with high ethylene content. It may have melt flow rate MFR (at 190° C./2.16 kg) of 3.5 g/10 min. Density may be of 0.897 kg/m$^3$. Melting temperature may be 81° C.

In an example, polybutene-ethylene copolymer may be a random copolymer of butene-1 with medium ethylene content. It may have melt flow rate MFR (at 190° C./2.16 kg) of 2.5 g/10 min. Density may be of 0.901 kg/m$^3$. Melting temperature may be 85° C.

The core layer may further contain at least one of the following cyclic polymers: cyclic olefin copolymer (COC), cyclic olefin polymer (COP), and cyclic block copolymer (CBC). A total amount of cyclic polymer(s) may be between 0 and 10 wt. %, preferably between 0 and 5 wt. %.

Examples for cyclic polymers, such as cyclic olefin copolymer (COC), cyclic olefin polymer (COP), and cyclic block copolymer (CBC), suitable for the core layer are presented in previous in context of skin layer composition.

According to an embodiment, a core layer comprises linear low density polyethylene (LLDPE). LLDPE may be Ziegler-Natta catalyst based. Alternatively, LLDPE may be metallocene-catalysed. The amount of LLDPE in the core may be between 10 and 98 wt. %, or between 20 and 98 wt. %. Instead of LLDPE the core layer may comprise LDPE or MDPE.

Examples for polyethylene polymers suitable for the core layer are presented in previous in context of skin layer composition.

The core layer may further comprise at least one of the following cyclic polymers: cyclic olefin copolymer (COC), cyclic olefin polymer (COP), and cyclic block copolymer (CBC). An amount of cyclic polymer(s) may be between 2 and 40 wt. %, preferably between 5 and 20 wt. %.

The cyclic polymers in the core layer may have effect on achieving good adhesion between the core layer with skin layer(s). In addition, the cyclic polymers contained in the core layer may have effect of increasing the overall shrinkage of the film.

Cyclic olefin copolymer may be, for example, norbornene copolymerized with ethene. It may have norbornene content between 61 and 63 wt. %. A glass transition temperature of the cyclic olefin copolymer may be below 70° C., for example 65° C., when measured according to standard ISO 11357-1, -2,-3 with heating rate of 10° C./min. Melt volume rate (MVR) of the COC may be 6.0 cm$^3$/10 min, when tested according to standard ISO 1133 at 230° C. with test load of 2.16 kg. Density of the COC may be 1010 kg/m$^3$, when measured according to standard ISO 1183.

Other examples for cyclic polymers, such as cyclic olefin copolymer (COC), cyclic olefin polymer (COP), and cyclic block copolymer (CBC), suitable for the core layer are presented in previous in context of skin layer composition.

Examples for polyethylene polymers suitable for the core layer are presented in previous in context of skin layer composition.

According to still another embodiment, a core layer of a multilayer film may comprise a copolymer of alpha-olefin and alkyl acrylate, such as copolymer of ethylene and butyl acrylate. An amount of copolymer of ethylene and butyl acrylate may be between 70 and 100 wt. %. A core layer may include 100 wt. % of copolymer of ethylene and butyl acrylate. Alternatively a core layer may include copolymer of ethylene and butyl acrylate and terpolymer of propylene. An amount of copolymer of ethylene and butyl acrylate may be for example 70 wt. % and an amount of terpolymer of propylene 30 wt. %.

A copolymer of ethylene and butyl acrylates may provide good optical properties in addition to increased softness to the multilayer film, which may be used to improve the stretching properties of the multilayer film. Furthermore, the copolymer of ethylene and butyl acrylate may increase the heat resistance, such as a higher peak melting temperature, in comparison to other polymer compositions generally used in the core layer of a multilayer film, especially a thermally inducible multilayer film. Further still, multilayer film properties such as chain mobility and low temperature toughness, may be improved by increasing the butyl acrylate monomer content of the copolymer. The copolymer of ethylene and butyl acrylate may be a block or random copolymer. A preferred copolymer of ethylene and butyl acrylate may comprise in the range of 5% to 30% by weight, preferably in the range of 5 to 25% by weight, most preferably in the range of 5 to 15% or in the range of 10 to 15% by weight of butyl acrylate monomers. For example, the copolymer of ethylene and butyl acrylate may comprise a n-butyl acrylate content in the range of 5% to 30% by weight. A copolymer of ethylene and butyl acrylate may be particularly suitable as a compound in the core layer to control the free shrinkage behaviour of the film. A copolymer of ethylene and butyl acrylate may further comprise a melting temperature in the range of 96° C. to 104° C., preferably in the range of 97° C. to 103° C. In particular, a copolymer of ethylene and butyl acrylate may be used to control the stretching temperature of a multilayer film, such that the film may be stretched in a temperature in the range of 65 to 85° C., preferably in the range of 70 to 80° C. A copolymer of ethylene and butyl acrylate may further comprise a melt volume rate tested according to standard ISO 1133 at 190° C. with test load of 2.16 kg in the range of 0.20 to 1.5 g/10 min, preferably in the range 0.25 to 1.4 g/10 min. A preferred copolymer of ethylene and butyl acrylate may comprise a density in the range of 0.91 to 0.93 g/cm$^3$, preferably in the range 0.922 to 0.923 g/cm$^3$ according to standard ISO 1183 (Method A). The core layer may consist of copolymer of ethylene and butyl acrylate. A copolymer of ethylene and butyl acrylate is readily available, and has a large shrinkage potential when compared to other alkyl acrylate monomers, such as copolymers of ethylene and ethyl acrylate or methyl acrylate. The copolymer of ethylene and butyl acrylate may be preferred, in particular, in the core layer, when combining the core layer to adjacent skin layers comprising stiffness. A core layer comprising copolymer of ethylene and butyl acrylate may be particularly suitable for objects which comprise a rigid body, which supports the shape of the object. For example, copolymer of ethylene and butyl acrylate may be used on roll-fed applications, where seaming is done on a cylinder prior to application to the bottle. The seaming method may use, for example, solvent, laser, heat-seal or ultrasonic radiation. The stiffness of the label is not critical in such applications, as each item to be labeled is provided in place automatically. A copolymer of ethylene and butyl acrylate may be combined with propylene copolymer or terpolymer to modify the properties of the core layer. In particular, by mixing copolymer of ethylene and butyl acrylate with a copolymer of ethylene and propylene, the stretching temperature of the core layer may be reduced.

EXAMPLES

According to a first example, a shrink label comprises a multilayer face film comprising a first skin layer and a second skin layer, wherein said skin layers comprise at least a first cyclic olefin copolymer $COC_1$ and a second cyclic olefin copolymer $COC_2$. The first cyclic olefin is different from the second cyclic olefin having at least different glass transition temperatures ($T_g$). Glass transition temperatures of both the first cyclic olefin copolymer and the second cyclic olefin copolymer are between 30 and 100° C. A difference in the glass transition temperatures of the first cyclic olefin copolymer and the second cyclic olefin copolymer may be at most 60° C. or at most 50° C. The difference in the glass transition temperatures of the first cyclic olefin copolymer and the second cyclic olefin copolymer may be at least 5° C., preferably at least 10° C. The glass transition temperature of the first cyclic olefin copolymer may be below 70° C., preferably below 50° C. The glass transition temperature of the second cyclic olefin copolymer may be equal or above 65° C., or equal or above 70° C.

An amount of $COC_1$ may be between 44 and 77 wt. %, between 50 and 77 wt. %, or between 65 and 75 wt. %. An amount of $COC_2$ may be between 10 and 44 wt. %, between 15 and 35 wt. %, or between 15 and 25 wt. %.

According to a second example, the skin layer(s) may comprise a first cyclic olefin copolymer $COC_1$ and a second cyclic olefin copolymer $COC_2$ exhibiting a glass transition temperature of the first cyclic olefin copolymer and the second cyclic olefin copolymer between 50 and 90° C. A difference in the glass transition temperature of the first cyclic olefin copolymer and the second cyclic olefin copolymer may be at most 40° C., preferably at most 30° C. The difference in the glass transition temperature of the first cyclic olefin copolymer and the second cyclic olefin copolymer may be at least 5° C., preferably at least 10° C. The glass transition temperature of the first cyclic olefin copolymer may be below 70° C. and the glass transition temperature of the second cyclic olefin may be above 70° C.

For example, the first cyclic olefin copolymer $COC_1$ may have glass transition temperature of 65° C. measured according to standard ISO 11357-1, -2,-3 with heating rate of 10° C./min. The second cyclic olefin copolymer may have a glass transition temperature of 78° C. Melt volume rate tested according to standard ISO 1133 at 230° C. with test load of 2.16 kg of $COC_1$ may be 6.0 cm$^3$/10 min. Melt volume rate of $COC_2$ may be 11.0 cm$^3$/10 min. Density of $COC_1$ and $COC_2$ may be 1010 kg/m$^3$, when measured according to standard ISO 1183.

At least one skin layer may comprise equal amounts of the first cyclic olefin copolymer and the second cyclic olefin copolymer. For example, a ratio of the first cyclic olefin copolymer to the second cyclic olefin copolymer $COC_1$/$COC_2$ may be between 1.5 and 8. For example, an amount of first cyclic copolymer may be between 40 and 80 wt. % and an amount of second cyclic olefin copolymer may be between 8 and 35 wt. %. Amount of cyclic olefin copolymer(s) in skin layer(s) may be at least 50 wt. %, or at least 60 wt. %.

Amount of cyclic olefin copolymer(s) may be up to 100 wt. %, or at most 98 wt. %, or at most 90 wt. %. For example, an amount of cyclic olefin copolymer(s) may be between 50 and 100%, or between 50 and 90 wt. %, or between 60 and 90 wt. %.

The first and second cyclic olefin copolymers according to embodiments may have effect on the shrinking behaviour of the film. For example, a specific shrinkage curve may be achieved with the at least some/all embodiments.

In addition, skin layer(s) may comprise linear low density polyethylene (LLDPE). Preferably, the LLDPE is Ziegler-Natta catalyst based. For example, LLDPE may be a copolymer of ethylene and 1-octene. Density of LLDPE may be 0.916 g/cm$^3$, when measured according to standard ASTM D792. Melt Index may be 2.0 g/10 min, when measured according to standard ASTM D1238 at 190° C./2.16 kg. Alternatively, metallocene-catalysed LLDPE may be used. For example, ethylene-hexene copolymer having density of 0.918 g/cm$^3$ and melt index 2.0 g/10 min, when measured according to standard ASTM D1238 at 190° C./2.16 kg.

For example, an amount of linear low density polyethylene may be at most 30 wt. %, or at most 20 wt. %, or at most 10 wt. % of the total weight of the skin layer. As an example, minimum amount of LLDPE may be between 5 and 10 wt. %. An amount of LLDPE may be between 0 and 30 wt. %, or between 5 and 20 wt. %, or between 10 and 20 wt. %. LLDPE has effect of reducing or avoiding the finger marking effect of the film. LLDPE may have effect of reducing un-wanted visual appearance, for example due to reducing or avoiding the finger marking effect of the film. LLDPE may have an effect of providing good interlayer attachment.

Further, skin layer(s) may contain additives, such as inorganic fillers, pigments, antioxidants, ultraviolet absorbers, anti-blocking agents, slip additives, antistatic additives, cavitating agents. For example, the first skin layer may comprise anti-blocking agent. An amount of anti-blocking agent may be between 0.5 and 5 wt. %, preferably between 1 and 3 wt. % or between 2 and 3 wt. %.

An intermediate i.e. core layer 4 may contain at least one terpolymer. Terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene. As an example, propylene terpolymer may have a density of 0.90 g/cm$^3$, when measured according to standard ISO 1183. Melt flow rate may be 5.5 g/10 min, when measured according to standard ISO 1133 at 230° C./2.16 kg. Alternatively the melt flow rate may be 0.9 g/10 min.

An amount of terpolymer(s) may be between 20 and 95 wt. %, preferably between 40 and 90, more preferably between 50 and 80 wt. %. For example 50, 55, 60, 65, 70, 75 or 80 wt. %. Terpolymer(s) may have effect on the orientation behaviour of the film. Terpolymer(s) may reduce the softening point of the film thus improving the stretching of the film. For example, films comprising terpolymer(s) may be stretched at a lower temperature. In addition, higher orientation ratios may be achieved, which may have effect on the shrinkage potential of the film. In a core layer of the film terpolymer(s) may have an effect on increasing the strength of the film. In addition, terpolymer(s) may have an effect on providing more stability for the film, which is advantageous during orientation process e.g. in avoiding the film tearing away from the grippers holding the film, particularly for orientation in the transverse direction.

In addition, the intermediate layer 4 may contain polyolefin plastomer and/or polyolefin elastomer. The intermediate layer may comprise at least one of the following: propylene/ethylene plastomer, ethylene/octene elastomer and ethylene/butene elastomer. Polyolefin elastomer may have density of 0.863 g/cm$^3$, when measured according to standard ASTM D729. Alternatively, density may be 0.867 g/cm$^3$. Melt flow rate may be 8.0 g/10 min, when measured according to standard ASTM D1238 at 230° C./2.16 kg. For example, polyolefin plastomer may have a density of 0.867 g/cm$^3$ and melt flow rate of 8.0 g/10 min. An amount of polyolefin plastomer and/or elastomer may be between 2 and 50 wt. %, preferably between 5 and 35 wt. % and more preferably between 10 and 30 wt. %. The core layer may comprise for example, total amount of 10, 15, 20, 25 or 30 wt. % polyolefin elastomer and/or polyolefin plastomer. Polyolefin elastomer(s) and or plastomer(s) may have a positive effect on the ability of the film to be stretched (oriented) and thus on the shrinkage potential of the film.

According to an embodiment, the intermediate layer may contain cyclic olefin copolymer. An amount of cyclic olefin copolymer may be 5 wt. %, 10 wt. %, or 20 wt. %, preferably less than 30 wt. %. For example, between 0 and 30 wt. %, or between 5 and 20 wt. %, or between 10 and 20 wt. %. The cyclic olefin copolymer in the intermediate layer may have effect on achieving good adhesion between the intermediate layer with skin layer(s). In addition, the cyclic olefin copolymer contained in the intermediate layer may have effect of increasing the overall shrinkage of the film. The intermediate layer according to embodiment may not resist shrinking of the film.

According to an embodiment, the multilayer film comprising at least a core layer, a first skin layer and a second skin layer is uniaxially oriented, i.e. stretched only in one direction. A film may be oriented in machine direction (MD). A film oriented in a machine direction provides controlled shrinkage of the film in MD direction during subsequent shrinking process. Alternatively, the films may be oriented in transverse direction (TD), so as to provide uniaxially in transverse direction oriented films having controlled shrinkage in transverse direction.

The film may be uniaxially oriented approximately from 2 to 10 times, preferably 3 and 9 times, and most preferably from 3 and 8 times. The film may be uniaxially oriented in machine direction. Draw ratio (or orientation ratio) of the MD film is from 2 to 10 (from 2:1 to 10:1), preferably from 3 and 9 (from 3:1 to 9:1), most preferably from 3 and 8 (from 3:1 to 8:1), correspondingly. Alternatively, the film may be uniaxially oriented in transverse direction, for example, from 2 to 10 times, preferably 3 and 9 times, and most preferably from 3 and 8 times.

For example, the films may be oriented at least 3 times at least in one direction, i.e. the draw ratio (stretching ratio) of the film is at least 3 in one direction of the film. Alternatively, the orientation ratio at least in one direction may be at least 4. For example, the draw ratio may be between 3 and 7, preferably between 4 and 6.

After the stretching the film is not heat set, i.e. not annealed, to provide maximum shrinkage for the multilayer shrink film. After stretching at elevated temperature the oriented film is immediately cooled by passing the film through cooling rolls. Cooling of the film may be gradual. After stretching, the film may be cooled with one or more cooling rolls having decreasing temperature profile starting at or just below stretching temperature and decreasing gradually to around room temperature. Consequently, subsequent application of heat causes the oriented film to relax and the oriented film may return towards or substantially back to its original unstretched dimensions. Thus, machine direction oriented films primarily shrink in the machine direction and transverse oriented films in the transverse direction.

In the following, $L_O$ corresponds to previously presented L1 and L(T) corresponds L2. Further, the following denotations are used ε strain (when positive) or shrinkage (when negative), ε(T) shrinkage of a film, after a heat treatment wherein the temperature of the thermally shrinkable plastic film has been T, defined as ε(T)=[L(T)−L]/L. For thermally shrunk materials ε(T)<0.

ε(98° C.) shrinkage of a film, after a heat treatment wherein the temperature of the thermally shrinkable plastic film has been 98° C., $ε_r$(T) relative shrinkage of a film, defined as ε(T)/ε(98° C.), a, b, c constants, f functions, $S_y$ a second direction of the film, in the plane of the film, and perpendicular to $S_x$, $L_{p0}$ a length of a film, in a second direction, before heat treatment, wherein the second direction is perpendicular to the first direction and is in the plane of the film, $L_p(T)$ the length of the a part of the film in the second direction after a heat treatment, in which the temperature of the thermally shrinkable plastic film is T, the part of the film having the length $L_p$ in the second direction before heat treatment, $\varepsilon_p(T)$ shrinkage or strain of a film in the second direction, after a heat treatment, in which the temperature of the thermally shrinkable plastic film has been T, after cooling the sample back to the temperature before the heat treatment, defined as $\varepsilon_p(T)=[L_p(T)-L_p]/L_p$, pp percentage point, i.e. the absolute difference of relative values given in percents, $A_2$, $A_1$ cross sectional areas of a part that is encircled by a loop formed from the film, $\rho_1$ density of a body that has been labeled or is to be labeled, $\rho_2$ density of a label, $A_{bl}$ an area between a label and a body.

The shrinkage $\varepsilon(T)$ for the temperature T is defined as the relative change in length in the first direction; i.e. $\varepsilon(T)=(L(T)-L_0)/L_0$. In a similar way, in the second direction, another shrinkage $\varepsilon_p(T)=(L_p(T)-L_{p0})/L_{p0}$, can be defined. It is noted that by this definition, the numerical value of shrinkage is negative, while the numerical value of strain would be positive. Thus a "better" shrinkage is, in terms of numbers, a more negative (i.e. a smaller) value. As is implicitly clear, in practical applications a thermally shrinkable film 1 can be shrunk using different heat sources such as hot air, hot gas, steam, and/or radiation. Thus, in practice, drying is not necessarily needed.

To more precisely define the shrinkage potential, a relative temperature dependent shrinkage $\varepsilon_r(T)$ is herein defined as $\varepsilon_r(T)=\varepsilon_p(T)/\varepsilon(98°\ C.)=\{[L(T)-L_0]/L_0\}/\varepsilon(98°\ C.)$. In this description, the value of $\varepsilon_r(T)$ will be given in percentages. The reason for selecting the reference temperature of 98° C. is that such a temperature is achievable using hot water or unpressurized (pressure equals 1 atm) steam. It is noted that the film may shrink also for temperatures above 98° C., however these are of little practical interest, since the films are commonly heated by water and/or steam. So, the value $\varepsilon(98°\ C.)$ is not a maximum shrinkage, only a reference value.

When the film uses most of its shrinkage potential for a reasonable small temperature change, the difference $\varepsilon_r(T_2)-\varepsilon_r(T_1)$, between the values of the relative temperature dependent shrinkage $\varepsilon_r(T)$ for at least one pair of two temperatures $T_2$ and $T_1$, the temperatures having a difference $T_2-T_1=15°$ C., is more than 50 percentage points (pp); wherein the lower of the two temperatures, $T_1$, is from 65° C. to 70° C. For example, the lower of the two temperatures, $T_1$, may be 65° C., whereby $\varepsilon_r(80°\ C.)-\varepsilon_r(65°\ C.)$ is more than 50 pp. For example, the lower of the two temperatures, $T_1$, may be 70° C., whereby $\varepsilon_r(85°\ C.)-\varepsilon_r(70°\ C.)$ is more than 50 pp. Preferably, the difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, is more than 65 pp; preferably more than 70 pp.

In addition or alternatively to the shrinkage $\varepsilon(T)$, the shrinkage behavior can be described using the relative shrinkage $\varepsilon_r(T)$ as defined above. In addition or alternatively to the shrinkage $\varepsilon_r(T)$, as discussed above, the relative shrinkage $\varepsilon_r(T)$ is preferably between limiting values in some specific temperatures.

First, for low temperatures, the relative shrinkage should be reasonably low. This is because the temperature during transportation may rise such that some shrinkage occurs. Thus, even if the film, when applied on a body, has already shrunk to some extent, the shrinkage potential of the film is still high, since the relative shrinkage is low.

Second, for high temperatures, the relative shrinkage should be reasonably high. This is because films that are purposely heat treated have preferably used most of their shrinkage potential. For example, when the crushed film floats on water, e.g. hot water, the crushed pieces are preferably not further shrunk on the water. For example, the crushed pieces may be collected using a sieve having a size, and further shrinking of the pieces might make the smaller than the sieve size. Thus their collection might become hard.

Furthermore, the further shrinking, as discussed, might curve or bend the crushed pieces, and the further utilization of such curved pieces might be more problematic than the utilization of planar pieces. The heat shrunk label would not have too much residual shrinkage potential left. High shrinkage potential of the label may be harmful when heated liquid (having a temperature around 80° C.) is used during the separation process, which will cause e.g. curling of the label into tight tubes blocking the washing apparatus.

According to an embodiment, a heat shrinkable (thermally shrinkable) label film having a first length $L_0$ in a first direction before heat treatment and a second length L(T) in the first direction after heat treatment wherein the temperature of the thermally shrinkable label film has been T, whereby the thermally shrinkable label film has a temperature dependent shrinkage $\varepsilon(T)=[L(T)-L_0]/L_0$, wherein the shrinkage of the thermally shrinkable label film, after a thermal treatment such that the temperature of the thermally shrinkable label film has been T=98° C., is $\varepsilon(98°\ C.)$, wherein the value of $\varepsilon(98°\ C.)$ is less than −0.45, optionally at most −0.85;

the shrinkage of the thermally shrinkable label film, after a thermal treatment such that the temperature of the thermally shrinkable label film has been T=65° C., is $\varepsilon(65°\ C.)$, wherein the value of $\varepsilon(65°\ C.)$ is greater than −0.10, preferably greater than −0.07; optionally at most 0;

and the thermally shrinkable label film has a relative temperature dependent shrinkage $\varepsilon_r(T)=\{[L(T)-L_0]/L_0\}/\varepsilon(98°\ C.)$, wherein the difference between the values of the relative temperature dependent shrinkage $\varepsilon_r(T)$ for at least one pair of temperatures $T_2$ and $T_1$ having a difference $T_2-T_1=15°$ C., i.e. $\varepsilon_r(T_2)-\varepsilon_r(T_1)$, is more than 50 percentage points; wherein the lower of the two temperatures of the pair, $T_1$, is from 65° C. to 70° C.

In the previously presented, the lower of the two temperatures $T_1$ may be 65° C. The difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, may be more than 65 percentage points, preferably more than 70 percentage points.

According to another embodiment, a heat shrinkable (thermally shrinkable) label film having a first length $L_0$ in a first direction before heat treatment and a second length in the first direction L(T) after heat treatment wherein the temperature of the thermally shrinkable plastic film has been T, whereby the thermally shrinkable label film has a temperature dependent shrinkage $\varepsilon(T)=[L(T)-L_0]/L_0$, wherein
the value of the temperature dependent shrinkage $\varepsilon(T)$ for the temperature T=65° C. is greater than −0.10, and
the value of the temperature dependent shrinkage $\varepsilon(T)$ for the temperature T=80° C. is less than −0.25.

According to another embodiment, a heat shrinkable (thermally shrinkable) label film having a first length $L_0$ in a first direction before heat treatment and a second length L(T) in the first direction after heat treatment wherein the temperature of the thermally shrinkable label film has been T, whereby the thermally shrinkable label film has a temperature dependent shrinkage $\varepsilon(T)=[L(T)-L_0]/L_0$, wherein
the shrinkage of the thermally shrinkable label film, after a thermal treatment wherein the temperature of the thermally shrinkable label film has been T=98° C., is $\varepsilon(98°\ C.)$, wherein
the value of $\varepsilon(98°\ C.)$ is less than −0.45, optionally at most −0.85; and
the thermally shrinkable label film has a relative temperature dependent shrinkage $\varepsilon_r(T)=\{[L(T)-L_0]/L_0\}/\varepsilon(98°\ C.)$, wherein
the value of the relative temperature dependent shrinkage $\varepsilon_r(T)$ for the temperature T=65° C. is less than 10% and
the value of the temperature dependent shrinkage $\varepsilon_r(T)$ for the temperature T=80° C. is more than 45%.

Manufacturing Heat Shrink Labels

Manufacturing a Face Film

Non-oriented face film may be manufactured by using either a cast or blown-film extrusion process. A shrinkable face film may be obtained by stretching (drawing) the extruded, non-oriented, face film to an extent several times its original dimension to orient the film. Stretching may also be designated as orienting. Extruded film may be stretched uniaxially in transverse direction (across the film). Alternatively, the film may be stretched uniaxially in machine direction (lengthwise).

The stretching in TD may be performed by heating the continuous film web and stretching it in transverse direction on a tenter frame. The stretching may be performed below the melting temperature of the polymer and/or at or near the glass transition temperature of the polymer. Preferably the film stretching temperature is between 50 and 130° C. For example between 50 and 120° C., preferably between 60 and 110° C. or between 60 and 100° C. After stretching, the film may be cooled with one or more cooling rolls having decreasing temperature profile starting at or just below stretching temperature and decreasing gradually to around room temperature. Stretching and subsequent cooling may provide suitable shrink potential for the film. Due to the shrink potential, the oriented films are able to shrink under elevated temperature towards the non-oriented (initial) state of the film.

The stretching in MD may be performed by means of a machine direction orienter via rolls with increasing speed. The stretching occurs due to a difference in speed between the last and the first rolls. In a stretching process the rolls are heated sufficiently to bring the substrate to a suitable temperature, which is normally below the melting temperature $(T_m)$, or around the glass transition temperature $(T_g)$ of the polymer.

The uniaxially stretched and subsequently cooled films are referred to non-annealed films having shrinkage potential and ability to shrink when external energy is provided to the film. In other words, non-annealed film refers to a film which is not relaxed to become temperature stable.

Non-annealed film has shrinkage potential, when e.g. temperature exceeds a certain limit. Respectively annealed film refers to film which is relaxed to have better temperature stability, for example, within a certain temperature range defined by the annealing temperature.

A face film may be oriented at least 2 times in a one direction, i.e. the draw ratio (stretching ratio) of the film is at least 2 in the one direction of the film. Alternatively, the orientation ratio in one direction may be at least 3. For example, the draw ratio may be between 2 and 10, preferably between 3 and 8, or between 4 and 6.

A face film may be uniaxially oriented in machine direction approximately from 2 to 10 times, preferably from 3 and 8 times. Thus, draw ratio (or stretching ratio) of the face film in MD may be between 2 and 10, preferably between 3 and 8.

A face film may be uniaxially oriented in transverse direction approximately from 2 to 6 times, preferably from 3 and 6. Thus, draw ratio (or stretching ratio) of the face film in TD may be between 2 and 6, preferably between 3 and 6.

After orienting (stretching) the face film is not heat set, i.e. not annealed, in order to provide shrinkage for the film. After stretching at elevated temperature the oriented film is immediately cooled by passing the film through cooling rolls. Cooling of the film may be gradual. After stretching, the film may be cooled with one or more cooling rolls having decreasing temperature profile starting at or just below stretching temperature and decreasing gradually to around room temperature. Cooling is performed in steps and the cooling roll temperatures may be selected between 20 and 80° C. Consequently, subsequent application of heat causes the oriented film to relax and the oriented film may return towards or substantially back to its original un-stretched dimensions. Thus, transverse direction oriented films primarily shrink in the transverse direction.

Referring to FIG. 1, not heat set (non-annealed), uniaxially oriented face film 1 having dimensions of length L1, width w1 and thickness d1, is arranged to shrink under application of heat so as to form a shrunk face film 10. Uniaxial orientation direction $S_x$, of the film is parallel to the film length L1 and L2. Uniaxial orientation direction may be, for example, transverse direction TD. Alternatively, uniaxial orientation direction may be machine direction MD. The corresponding film dimensions are length L2, width w2 and thickness d2 after shrinking. Under heating the uniaxially oriented film 1 is capable of shrinking in the direction of the orientation $S_x$. In other words, the length of the film reduces, when heating is applied, i.e. L1>L2. If the film is oriented only in one direction $S_x$, in the perpendicular direction $S_y$, the dimension w1 is substantially equal to w2 after heat treatment. Same applies to the labels comprising uniaxially oriented face film.

The oriented face film, i.e. shrinkable face film may be printed in order to provide visual effect and/or to display information. Printing may be performed by using traditional printing processes, for example, flexographic, gravure offset, and digital printing methods, such as liquid-toner, dry-toner or ink-jet processes. A multilayer face film may comprise printing on a surface of a first skin layer. Alternatively the reverse side of the multilayer structure may be printed, i.e. a second skin layer may comprise printing. The graphic patterns may be printed on at least one of the outer skin layers of the multi-layered film. When printing the second skin layer of the film, the film may be referred to as reverse-printed. During labelling the reverse-printed film the printing is in direct contact with a surface of an item to which the film is applied. The print is viewed through the multilayer face film i.e. the printing is visible through the face film. With these kind of films no further layers may be needed to protect the printing e.g. from abrasion or scratching during handling of the labelled items.

The face film surface may be treated prior to printing. The print receiving surface may be treated by flame treatment, corona treatment, or plasma treatment in order to increase the surface tension of the surface and to enhance, for example, adhesion of the printed graphics. A low surface tension may lead to poor retaining capability of printing ink applied to the surface.

The face film may also be treated after printing. Such treatment may include, for example, over-varnishing or other coating methods to provide protection to the printing and/or adding other enhanced visual effects in addition to the information print.

The face films described in previous are suitable for shrinkable labels and use for labelling of items. The films are suitable for labelling of a wide range of product designs and particularly suitable for highly contoured containers and products comprising curved sections, recesses and/or protrusions at their outer surface. Thus, for example, a diameter of the bottle may alternate. A container may comprise different diameters. Difference between the diameters to be labelled in a container may be up to 30%, or up to 20%, or 2-30%, or 5-20%, or 8-15%. According to an example, the difference between the smallest diameter and the largest diameter of the item to be labelled may be up to 30%, or up to 40%, or up to 50%, or up to 60%, or up to 70%, or 2-70%, or 5-60%, or 10-35%. The item may also be recyclable. The labels comprising heat shrink multilayer face film are suitable for items of glass, plastic, ceramics, glass, and metal. Shrinkage properties of films and/or labels enable labels to be used in highly contoured containers. The item may comprise or consists of polyethylene terephthalate (PET). The item may have a shape of a bottle. The films of the invention may also be used for labelling of batteries. The films may also be used as a face stock of a label laminate further comprising an adhesive layer and a release liner. For example, film according to the some or/all embodiments may be used for a face stock of a wash-off labels. Wash-off labels may be used e.g. for labelling of glass bottles. Due to the shrinking capability of the film, the labels may be efficiently detached and removed (washed-off) from the surface labelled during subsequent washing process.

Manufacturing Shrink Labels and Methods for Labelling

A shrinkable face film may be used for providing shrinkable labels, also referred to as shrink labels or shrinking labels. Shrinkable labels are shrinking under exposure to external energy, such as elevated temperature. Shrink labels are referred to more particularly as heat shrink labels when shrinkable under exposure of elevated temperature i.e. heat. Shrinkable labels include both shrink sleeve labels and roll-fed shrink film labels. The shrinkable label may also be one of the following: tamper evident label, security label and shrinking seal label. The label may be a full body label, i.e. the label may cover the whole outer surface of the item labelled. Full body label is shown e.g. in FIG. 5. Alternatively, the label may cover the item only partially. Referring to FIG. 6, for example a neck of a bottle 23 may be left without a label, or a separate and/or different label may be used for the bottle neck part than for the bottle volume part. For example, a cap of the bottle may be covered with a shrinkable label.

"Roll-fed shrink film" (RFS) and shrink label 15 produced thereof refers to a labelling process, where a ready cut face film is rolled over a container or a mandrel so as to form an individual label, which is subsequently shrunk around an article to be labelled under exposure to external energy, such as elevated temperature, in order to conform shape and size of the article. A roll-fed shrink film label comprises or consists of a shrinkable face film. The face film may be a monolayer or multilayer film. In addition, the label comprises at least some graphics on a surface of the face film.

"Shrink sleeve label" also referred to as "a shrink sleeve label" or to as "a shrinkable sleeve label" refers to a label in the form of tubular sleeve 16. Individual labels may be cut form the continuous tubular sleeve and fitted around an article to be labelled and shrunk around the article under exposure to external energy, such as elevated temperature. Tubular sleeve is made from a shrink face film by seaming. A shrink sleeve label comprises or consists of a shrinkable face film. The face film may be a monolayer or multilayer film. In addition, the shrink sleeve label comprises at least some graphics on a surface of the face film.

According to an embodiment, the stretching is performed in one direction of the film, e.g. in machine direction, i.e. in longitudinal direction of the film. Films stretched in machine direction may be referred to as machine direction oriented (MDO) films. In MDO films the polymer chains are oriented uniaxially in said machine direction. Machine direction oriented films may be used for roll-fed labelling, i.e. in a labelling process where the label film is supplied from a reel, cut into separate labels, after which labels are mounted around an item and seamed during labelling step using adhesive, such as UV-acrylic hot-melt adhesive. Alternatively seam may be formed by solvent seaming, hot-bar (heat-sealing), laser-welding or ultrasonic radiation. During mounting the label around an item some adhesive may be used between the label and the surface of the item in order to keep the label in specified place. The label around the item may be shrunk in order to form a tight attachment and/or to conform the shape of the item.

Alternatively, the film may be stretched in transverse direction (TD), which means the direction perpendicular to machine direction of the film. Transverse direction (TD) may be referred also to as cross direction (CD). Transverse oriented films may be used for shrink-sleeve type of labels, which films are seamed into a form of a tube prior to labelling. The tube is cut into tubes of predetermined lengths and supplied as in a form of tube around an item. The labelled item may be heated in order to provide shrinking of the film around the item and/or to provide tight fitting of the label around the item and/or to conform the shape of the item with the label.

A shrinkable label being one of the following: tamper evident label, security label and shirking seal label may be un-printed. They may be clear. Alternatively they may be pigmented or they may comprise printing.

The graphics, such as printing or other type of visual coatings, may be applied on the face layer (either side) in a single process or via several printing or coating steps. It is also possible that the visual coating include metallic foil or ink or similar. It is most common that the printing is provided on the inside of the sleeve label, closest side to the item to be labelled. Printing is usually subsequently over-varnished.

According to an embodiment, a seaming of a TD oriented face film is carried out after printing the face film by the printer so as to provide a continuous tube. Referring to FIGS. 7a-c a continuous face film 1 is seamed into a continuous label tube 16 around the face film axis extending to the machine direction (S$_x$). Seaming may be provided by applying a liquid bonding solution, such as a solvent, to one periphery, for example to a first longitudinal edge 8, of the continuous face film 1, as shown in FIG. 7b. In other words, the seam area between the opposite overlapping edges of the face film may be bonded by using a solvent. Preferably a small amount i.e. a thin layer of solvent is applied. A small amount of solvent refers to an amount which is suitable for forming a strong seam and wherein the amount of solvent stays within the seam area i.e. within the area of the overlap forming the seam. Solvent is able to form the seam immediately. Solvent may be applied with a needle or using a felt tip.

Referring to FIG. 7b a small amount of solvent 9 is applied onto the surface of the film 1. Solvent may be applied as a solid "line". After applying the solvent the film is folded onto itself and a seam 14 and tube 16 is formed, as shown in FIG. 7c. The opposite longitudinal edges 8,12 of the face film overlap and form a seam 14. Overlapping opposite edges of the multilayer face film are forming the seam when the first skin layer and the second skin layer are bonded i.e. attached together, for example by using solvent. The solvent may partially dissolve the face film and the face film may be bonded to itself in the semi-liquid/semi-solid state forming a tube 16.

Figure 8:
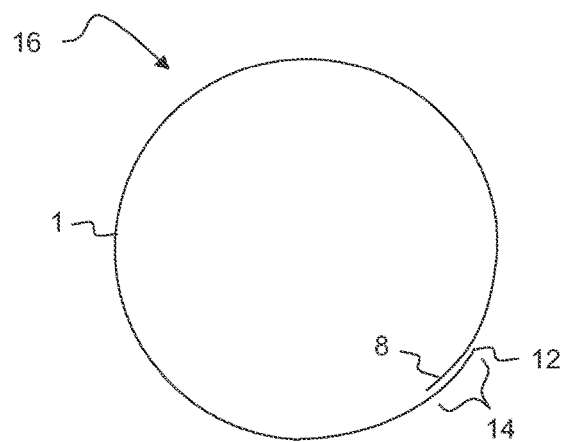
FIG. 8 shows, in a cross-sectional view, an example embodiment of a seamed shrink label, FIG. 9 process for providing a shrink sleeve label and labeling of an article.

In a FIG. 8 a cross section of a seamed tube i.e. a shrink sleeve label 16 is shown. A face film 1 is rolled onto itself so that a first longitudinal edge 8 and a second longitudinal edge 12 of the face film are overlapping and forming a seam area. In a multilayer face film structure a topmost skin layer, such as a first skin layer 2, and an undermost layer, such as a second skin layer 6, are overlapping and adjacent to each other in the seam area. A tight bond and a seam 14 between the overlapping edges may be provided by using a solvent. The multilayer face film may comprise printing on at least one of the skin layer. However, the seam area preferably remains non-printed. Thus, in the seam the opposite skin layers, such as a first skin layer and a second skin layer, are adjacent to each other and bonded together.

The tube may be re-wound to a roll for later use in labelling. Subsequent labelling process includes cutting the continuous tube 16 into individual shrink sleeve labels, which are dropped over an article to be labelled. During heating the label fits around the item. The shrink sleeve label is able to shrink onto the outer surface of the article and assume the shape of the outer surface when applying external energy, such as heat via conduction or radiation.

Figure 9:
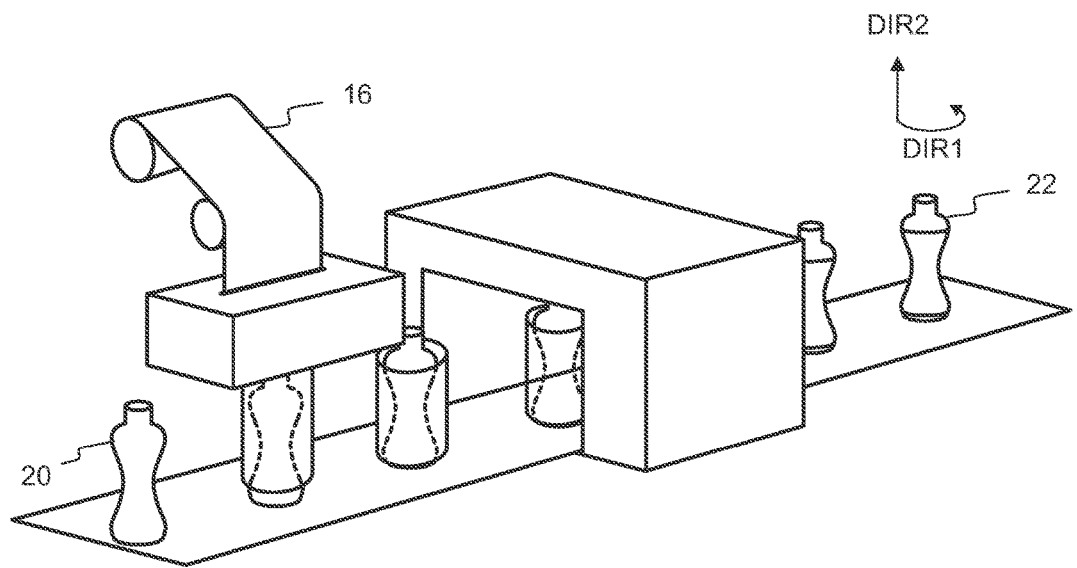

Referring to FIG. 9, a continuous tube (or sleeve) 16 is unrolled and cut into predetermined lengths and supplied as a form of individual tube label (sleeve label) around an item 20. The item or container may be warmed before a cylindrical tube label is introduced over it. Tube label around an item is heated in order to shrink the tube label around the item so as to form labelled article 22. The transverse direction orientation of the tube label extends circumferentially around the item DIR$_1$. Thus, the label is able to primarily shrink in the transverse direction and is able to fit tightly around the item 20.

According to an embodiment, a method for labelling may comprise the following steps:
  providing a continuous TD oriented face film in a roll, unrolling and printing the film,
  seaming the continuous printed face film to provide a continuous tube,
  rewinding of the continuous tube to a roll,
  unwinding and cutting the continuous tube so as to form shrink sleeve label,
  applying the cut shrink sleeve label around an item (e.g. by dropping of the cut tube around an item) and
  applying external energy providing shrinking of the label so as to fit the label tightly around the item.

The method may further include applying further coating layer or coating layers on the face film after printing prior to seaming.

Rewinding of the continuous tube may be optional. In other words, the continuous tube may be cut and applied around an item immediately after seaming.

According to another embodiment, a MD oriented face film is used for providing shrink labels 15 and labelling of an item. A MD oriented face film comprising printing is supplied from a reel, cut into individual labels and applied around an item. Adhesive (e.g. hot melt adhesive) may be used to hold the individual label on the surface of the item. The adhesive may be applied on the label or onto the item in an area between the leading edge of the label and the surface of the item. The adhesive may also be applied between trailing and leading edges of the label in the area forming a seam 14. Alternatively, seaming may be provided by applying a liquid solvent seaming solution. When rolled over to an item, the trailing and leading edges 11, 13 may overlap and form a seam 14, as shown in FIG. 3. Referring to FIG. 4, subsequent shrinking process e.g. at high temperatures enables tight fitting of the label 18 around the item 20. The shrunk label 18 is able to provide a smooth and consistent coating for the item. Heat shrinking may occur at a shrink tunnel, where for example hot air may be blown towards passing items. The described process may be called as on-line labelling process. Roll-fed shrink films may be uniaxially oriented in machine direction (MD). When a label consists of a MDO face film, and the machine direction of the face film extends circumferentially around the item DIR$_1$, the label is arranged to shrink primarily in the orientation direction when heated.

According to an embodiment, a method for labelling may comprise the following steps:
  providing a continuous MD oriented face film in a roll, unrolling and printing the film,
  rewinding of the printed face film to a roll,
  unwinding and cutting the printed face film into desired length of a label,
  wrapping the face film around a cylindrical mandrel and seaming the face film in order to provide a shrink label,
  replacing the label from the cylindrical mandrel around an item to be labelled
  applying external energy providing shrinking of the label so as to fit the label tightly around the item.

Instead of wrapping the face film around a separate cylindrical mandrel for seaming, the seaming may also be provided directly on the item to be labelled after cutting the label into a proper length.

The method may further include applying further coating layer or coating layers on the face film after printing prior to seaming.

Rewinding of the continuous tube may be optional. In other words, the continuous tube may be cut and applied around an item immediately after seaming.

According to still another embodiment, a method for labelling of a shrinkable label being one of the following: a tamper evident label, a security label and a shirking seal label may be provided with either of the labelling methods disclosed in previous. However, the method may not include printing step. In other words, the shrinkable label may be an unprinted label. For example, the label may be clear.

According to an embodiment, seaming of shrink labels may be carried out by using solvents which attack the surface of the face film by dissolving it. Surfaces are subsequently welded together forming a strong bond sem.

According to an embodiment, seaming is carried out by using at least one of the following natural solvents: alpha-pinene and limonene. Alternatively, mixtures of tetrahydrofuran (THF) may be used as a solvent. For example, a mixture of THF includes THF and 1,3-Dioxolene in the ratio of 60:40, respectively. Alternatively a ratio of THF and 1,3-Dioxolene may be 55:45 or 65:35. Also other ratios of THF and 1,3_Dioxolene may be used. Additionally solvents such as o-chlorotoluene (CAS number 95-149-8), 4-chlorotoluene (CAS number 106-43-4) and p-chlorobenzotrifluoride (CAS number 98-56-6) or mixtures of these may be used. It also possible to use at least one of the following solvents: 12-103, 1518, 468, 7-72S, 782XD, 12-96, 12-103AT, 331, 56R-OPS, 56R4-OPS, 1505B, 10-20G and 11-40A RV from Flexcraft Industries, Inc.

Alpha-pinene, (1S,5S)-2,6,6-Trimethylbicyclo[3.1.1] hept-2-ene ((−)-α-Pinene), is an organic compound of terpene class. It is an alkene and contains a reactive four-membered ring. It has a molecular formula $C_{10}H_{16}$ and molecular weight 136.23 g/mol. Melting point may be −64° C. and boiling point 155° C. at 760 mmHg. Density may be between 0.8580 and 0.8620 g/ml ($d_{20}$) at 20° C.

Limonene, 1-Methyl-4-(1-methylethenyl)-cyclohexene, is a monocyclic terpene. Limonene has a formula of $C_{10}H_{16}$ and formula weight 136.23 g/mol. D-limonene has density 0.838-0.85 (25 degrees C.), refractive index 1.471-1.474, and optical rotation 96-104.

The solvent may provide at least partial melting of the polymer material of the face in the seam area. Melting of the polymer at the interface may have effect on causing material diffusion and joining of the polymer chains in the seam area, thus forming a strong seam.

According to at least some/all embodiments the seaming of the face film with alpha-pinene, limonene or mixtures of tetrahydrofuran (THF) provides high quality seam for the shrink label. High quality seam includes both high visual and functional quality, such as flat and smooth seam with high strength and without discoloration. For example, whitening of the seam may be avoided.

Visual quality of the seam relates to any effect that might make the seam to visually differ from the face film material. High visual quality means that the seam does not clearly visually differ from the other parts of the label due to discoloration, cloudiness, whitening or other similar visual effects.

Functional quality of the seam relates to the strength and straightness of the seam. High quality seam has uniform high straightness, does produce any wrinkles or uneven pulling on the seam and allows the shrinking to take place uniformly and without forming any significant tactile (sensation of the smoothness) unevenness to the seam.

Labelling process includes introducing a shrink label around an item. For example, a shrink sleeve label may be dropped over an item to be labelled. The item may be highly contoured containers, such as shampoo and detergent bottles, and drink containers. The item may also be a battery. Subsequently the item including the shrink label around may be fed through a shrink-tunnel at elevated temperature causing the label to shrink and fit the shape of the item. Shrinking temperature may be between 65 and 140° C. or between 65 and 98° C. In an example, heating temperature of the shrink film and label produced thereof may be between 80 and 150° C., preferably between 120 and 130° C. in hot-air tunnels or between 80 and 90° C. in steam tunnels.

The heat that induces shrinkage of the label can be provided by conventional heat sources, such as hot steam, heated air, infrared radiation, or the like, or any combination of these.

Shrinkage of a shrink sleeve label may be focused only on a local area or to the whole label area. Local shrinkage may be focused on required areas, for example on an edge area of a label. Whole label may be shrunk in a direction extending circumferentially around a container to conform to the outside (external) shape of the container Local shrinkage may be focused on required areas, for example on an edge area of the container.

Figure 5:
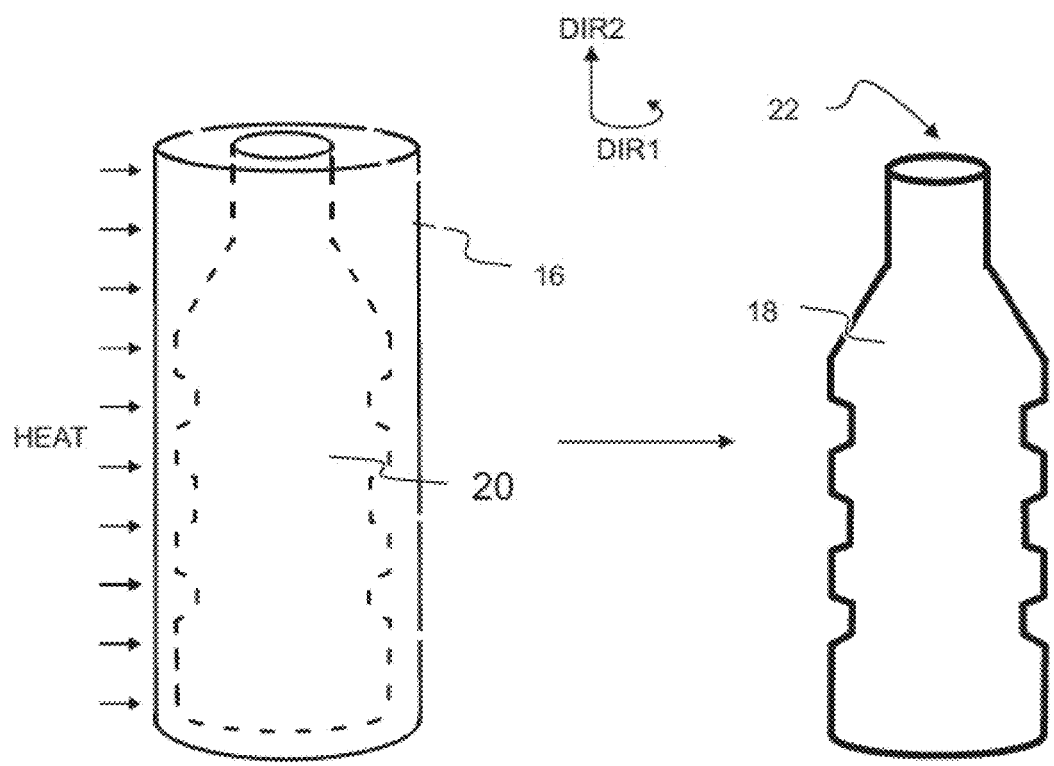
FIG. 5 shows an example of a shrink label around an article and a labeled article.
Figure 6:
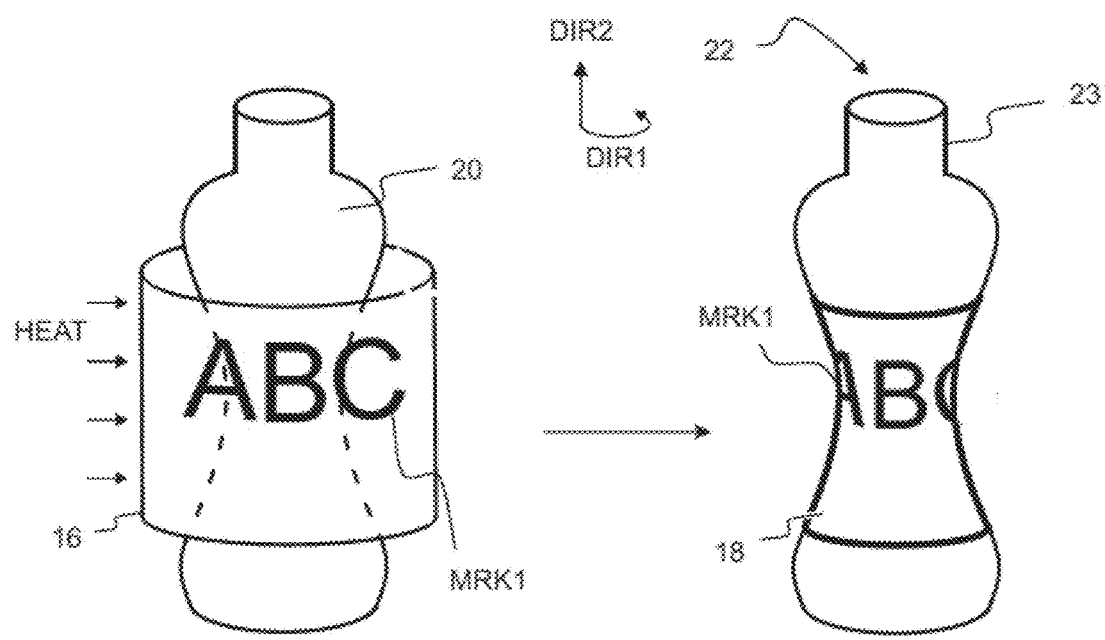
FIG. 6 shows an example of a shrink label around an article and a labeled article.

Referring to FIG. 5 a shrink label 16 may be a full body label, i.e. the shrunk label 18 may cover substantially the whole outer surface of the item 20. Alternatively, the label 15,16 may cover the item only partially, as shown in FIGS. 4 and 6. Referring to FIG. 6, for example a neck of a bottle 23 may be left without a label, or a separate and/or different label may be used for the bottle neck part than for the bottle volume part.

At least some/all embodiments have effect on shrinking capability of the shrinkable face film and shrinkable label produced thereof. Shrinkage may be least 15% preferably at least 25% or at least 35% shrinkage in the direction of orientation between temperature of 65 and 98° C. Below 65° C. shrinkage is less than 10%, preferably less than 5%, for example between 0 and 10%, or between 0.5 and 5%. In other directions (non-oriented, non-shrinking directions) of the film the shrinkage may be less than 10% or less than 5%. In the other directions expansion of the film may be less than 5%.

At least some/all embodiments have shrinking capability between 20 and 75%, preferably between 25 and 60% at a temperature range between 65 and 98° C.

At least some/all embodiments of the face films and label produced thereof have controlled shrinkage, i.e. specific amount of shrinkage at specific temperature range. The films have an ability to shrink upon exposure to external energy, e.g. some level of heat. Shrinkage of the film is activated when the film is treated e.g. at elevated temperatures, such as passed through a hot air or steam-tunnel. The shrink performance, i.e. shrinking capacity (potential) of the films in the stretching direction is very high at elevated temperatures. In an example, overall shrinkage may be over 50% at temperature range from 65 to 90° C. or from 70 to 85° C.

According to an embodiment, shrinkage of the multilayer films of the invention at temperatures between 80 and 150° C., preferably between 80 and 110° C., more preferably between 80 and 90° C. may be more than 20% in the orientation direction of the film. Preferably, shrinkage may be between 20 and 40%, or between 40 and 60%, or more than 60%, for example at least 70% in the direction of the orientation of the film. Referring to FIG. 1, the orientation direction may be parallel to $S_x$. The shrinkage may be between 20 and 90%, preferably between 25 to 80%, and most preferably between 30 and 75% under normal shrink film and label shrinking temperatures between 80 and 150° C., preferably between 80 and 130° C., more preferably between 80 and 110° C., more preferably between 80 and 90° C. in a steam-tunnel. In other than orientation direction, the films may have shrinkage less than 10%, preferably less than 7%, most preferably less than 5%, for example between 0 and 5% or between 2 and 4%. Referring to FIG. 1, the other than orientation direction may be direction parallel to $S_y$. The shrink performance of the multilayer films is adequate in order to conform the film to the profile of the substrate, which is to be labelled.

A face film according to at least some/all embodiments and a label comprising the face film is able to shrink in the direction of the orientation of the face film between 20 and 75% at a temperature range between 65 and 85° C. Preferably, the face film and a label comprising the face film is able to shrink between 25 and 65% at a temperature range between 65 and 85° C. For example, the face film and a label comprising the face film is able to shrink between 25 and 55%, or preferably between 30 and 40% at a temperature range between 65 and 85° C. According to another example, the face film and a label comprising the face film is able to shrink between 35 and 65%, or preferably between 40 and 60% at a temperature range between 65 and 85° C. At temperature below 65° C. the face film and the label comprising the face film shrinks preferably less than 10%. The specific shrinkage profile of the face film and the label comprising the face film has an effect of on providing more controlled shrinkage behaviour for the film at a specific temperature. For example, specific shrinking curves of some/all embodiments may have an effect on more accurate shrinkage to be achieved even if some variation occurs during thermal treatment (shrinking process).

The composition of the multilayer face film according to embodiments has effect of providing adequate shrinkage level for the label, preferably at least 65% shrinkage at 85° C., which is further advantageous during washing in subsequent recycling process. The heat shrunk label would not have too much residual shrinkage potential left. High shrinkage potential of the label may be harmful when heated liquid (having a temperature around 80° C.) is used during the separation process, which will cause e.g. curling of the label into tight tubes blocking the washing apparatus.

In an example, shrinkage may be measured according to the following method: providing a sample with measured and marked 100 mm*100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method; however, it is evident, and has been noticed, that the same shrinkage properties apply regardless of the method, provided that the same temperatures are used. I.e. the composition of heat transfer medium (air, steam, water) is not critical for shrinkage behaviour.

At least some/all embodiments have effect on providing no-label look or appearance, when attached to the surface of an item. The clear no-label look allows the objects beneath such label, i.e. the bottle or contents, to be visible through such label. Clarity of the film and a label comprising said film can be measured and evaluated by the haze values. The overall haze of the multilayer film and label consisting of said multilayer film may be less than 25%, preferably less than 15%, and most preferably less than 10% or less than 5%, when measured according to the standard ASTM D1003. For example, the haze of the face film may be between 2 and 10%, or between 5 and 10%. For example, the haze of the face film between 2 and 10%, may have effect on providing good visual appearance for the face films and labels thereof.

According to an embodiment, initially clear face film of a label may be printed on the reverse side of the face film and the printing is visible through the face film. Thus, the printing is adjacent to the surface of the labelled item and as such protected, for example, from scuffing. The printing may be multi-layered comprising two or more printing layers. For example, colour printing at the film surface may be covered (overprinted) with a white or some other colour printing. Thus, the overprinting is next to the surface of the item. Through this kind of label the object beneath is not visible.

At least some/all embodiments have effect on printability of the face film. The face film may have effect on enabling high printing quality. According to some/all embodiments the face film has excellent ink adhesion and register control, allowing for example gravure printing. Wetting surface tension of the print receiving skin layer may be higher than or equal to 38 mN/m, for example 44 mN/m, when measured according to standard ISO 8296. For example, the print receiving skin layer may have a surface energy at least 36 dynes/cm, preferably at least 38 dynes/cm or at least 42 dynes/cm measured according to the standard ASTM D-2578. The surface energy may be between 36 and 60 dynes/cm, preferably between 38 and 56 dynes/cm or between 42 and 50 dynes/cm. Surface energy expressed in units of dynes/cm meaning force/unit length may also be expressed in units of mN/m.

The face film according to at least some/all embodiments may have tensile strength in the orientation direction of the film between 90 and 170 MPa. Elongation in orientation direction of the film may be between 20 and 50%. Bending resistance (L&W 5 mm, 15°) may be between 10 and 20 mN. 1% secant modulus in the orientation direction of the film may be at least 500 MPa. For example between 700 and 2000 MPa, between 1200 and 2000 MPa, or between 700 and 1800 MPa, or between 1200 and 1800 MPa, when measured according to standard ISO 527-3.

The face film according to at least some/all embodiments may have a shrink force in the orientation direction of the face film during heating at temperatures between 60 and 98° C. is less than 10 N/15 mm, or less than 8 N/15 mm, or 1-10 N/15 mm, or 2-8 N/15 mm. Adequate shrink force is needed for the proper fitting of the label around an item when heat is applied.

The face film according to at least some/all embodiments may have effect on providing the overall film density less than 1 g/cm³. Preferably the density is less than 1 g/cm³ also after printing of the film. The density may be, for example between 0.90 and 0.98 g/cm³, or between 0.90 and 0.95 g/cm³. In an example, the multilayer plastic film contains less than 20 wt. %, preferably less than 10 wt. % or less than 5 wt. % polymeric material having high density. The polymeric material is preferably the film forming material, i.e. the raw material of the multilayer face film. High density refers to density greater than or equal to 1.3 g/cm³, or greater than or equal to 1.25 g/cm³, or greater than or equal to 1.1 g/cm³. An amount of high density material having density between 1.1 and 1.5 g/cm³, between 1.1 and 1.3 g/cm³, or between 1.1 and 1.25 g/cm³ may be, for example, between 5 and 20 wt. %, preferably between 5 and 10 wt. %, or preferably between 1 and 5 wt. %, and most preferably between 0.5 and 5 wt. %. The densities are typically measured near room temperature, such as 25° C. For example, the multilayer plastic film preferably does not include polymeric raw materials, such as polyvinylchloride or polyethylene terephthalate.

Low density of the film has effect of enabling the film and label comprising said film to be more easily separated from the substrates having higher density, such as PET bottles. Said film density allows the films to be separated from the substrate material during recycling process, for example in the normally used washing process of the bottles, i.e. flotation separation process, of the bottles or other containers. The separated labels may also be further recycled.

Multilayer face film structure according to at least some/all embodiments has effect of providing a heat shrinkable label which can be easily separated in re-cycling process from the item it is mounted. After the item comprising a label has been used, the item is crushed (grinded) into pieces. In particular, when the area in between the label and the surface of the item is free from adhesive, the film may be separated from the item during this crushing. After crushing the pieces of the labelled item may be take into washing step comprising a heated washing liquid. Temperature of the liquid may be around 80° C. In a preferred embodiment, the pieces of the item are separated from the pieces of the label based on the difference in their densities. For example, the label may float on a liquid (washing liquid) having a special density. The item may sunk in the liquid. In an embodiment, the item has a first density D1,
the label has a second density D2, and
the ratio of the second density to the first density, D2/D1, at most 0.9; preferably at most 0.8 or at most 0.7 at a temperature, such as at the temperature 80° C.

Thereby, when the liquid has a special density that is more than D2 and less than D1, the pieces of the item 8 sink into the liquid, while the pieces of the label 2 float on the liquid. At 80° C., the density of water is 972 kg/m$^3$. However, the density of the cleaning liquid can be affected by ingredients (e.g. salts) added to the cleaning liquid. Thus, in a preferred embodiment, the second density D2 (of the label) is less than 1000 kg/m$^3$, preferably less than 950 kg/m$^3$ at the temperature 80° C. Moreover, preferably in addition, the first density D1 (of the item) is more than 1000 kg/m$^3$ at the temperature 80° C.

For example, in an item comprising PET (having the density of about 1380 kg/m$^3$), and a label having the density of about 920 kg/m$^3$, the ratio is as low as 0.67.

In an embodiment, the thermally shrinkable face film (and the shrunk film of the item) has a density D2 of less than 1100 kg/m$^3$, preferably less than 1000 kg/m$^3$, such as less than 920 kg/m$^3$. The densities are typically measured near room temperature, such as 25° C., however, increasing temperature up to e.g. 80° C. does not affect the density much.

At least some/all embodiments have effect on functional quality of the seam. At least some/all embodiments enable high bond strength for the seam. For example, the seam does not open in a labelling process or during subsequent shrinking process after applied around an item. At least some/all embodiments have further effect on smoothness of the seam. Thus ensuring high quality appearance of the seam.

At least some/all embodiments have effect on visual quality of the seam. Clear and flat seams of heat shrunk films and labels produced thereof can be achieved. The seam neither discolours the film.

At least some/all embodiments have effect on enabling extended storage times of the face film up to several months, for example up to 24 months, before seaming and shrinking. Extended storage times does not have adverse effects to the visual or functional quality of the seam.

Above described effects may be preferably achieved with face films and shrink labels provided thereof having face film orientation ration at least 3, for example between 3 and 6.

NUMBERED EXAMPLES 1.1-1.40

Example 1.1

A heat shrink label capable to shrink under exposure to external energy comprising a multilayer face film oriented in one direction, the multilayer face film including a first layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer is below 50° C. and a glass transition temperature of the second cyclic olefin copolymer is between 5 and 60° C. higher than the glass transition temperature of the first cyclic olefin copolymer.

Example 1.2

The label according to example 1.1, wherein the difference in the glass transition temperature of the first cyclic olefin copolymer and the second cyclic olefin copolymer is at most 50° C., preferably at most 30° C.

Example 1.3

The label according to example 1.2, wherein the difference in the glass transition temperature of the first cyclic olefin copolymer and the second cyclic olefin copolymer is at least 10° C.

Example 1.4

The label according to any of the preceding examples, wherein the glass transition temperature of the second cyclic olefin is above 60° C.

Example 1.5

The label according to any of the preceding examples, wherein the first layer comprises equal amounts of the first cyclic olefin copolymer and the second cyclic olefin copolymer.

Example 1.6

The label according to any of the examples 1.1-1.4, wherein a ratio of the first cyclic olefin copolymer to the second cyclic olefin copolymer in the first layer is between 1.5 and 8.

Example 1.7

The label according to any of the preceding examples, wherein the first layer further comprises linear low density polyethylene.

Example 1.8

The label according to example 1.7, wherein an amount of linear low density polyethylene is at most 20 wt. % or at most 10 wt. % of the total weight of the first layer.

Example 1.9

The label according to any of the preceding examples, wherein the multilayer face film comprises a second layer comprising terpolymer of propylene.

Example 1.10

The label according to example 1.9, wherein an amount of the terpolymer of propylene is between 20 and 95 wt. %, preferably between 40 and 90, more preferably between 50 and 80 wt. %.

Example 1.11

The label according to example 1.9 or 1.10, wherein the terpolymer of propylene is at least one of the following: 1-butene/propylene/ethylene, propylene/ethylene/1-hexene and propylene/ethylene/1-butene.

Example 1.12

The label according to example 1.11, wherein the terpolymer of propylene comprises 1-butene.

Example 1.13

The label according to example 1.12, wherein the terpolymer of propylene is 1-butene/propylene/ethylene.

Example 1.14

The label according to any of the preceding examples, wherein the first layer is a first skin layer of the multilayer face film.

Example 1.15

The label according to any of the preceding examples, wherein the multilayer face film further comprises a second skin layer comprising a first cyclic olefin copolymer and a second cyclic olefin copolymer, wherein a glass transition temperature of the first cyclic olefin copolymer is below 50° C. and a glass transition temperature of the second cyclic olefin copolymer is between 5 and 60° C. higher than the glass transition temperature of the first cyclic olefin copolymer.

Example 1.16

The label according to any of the examples 1.9-1.15, wherein the second layer is a core layer arranged between the first skin layer and the second skin layer.

Example 1.17

The label according to any of the examples 1.9-1.16, wherein the second layer further comprises at least one of the following: polyolefin plastomer and polyolefin elastomer.

Example 1.18

The label according to example 1.17, wherein the second layer comprises at least one of the following propylene/ethylene plastomer, ethylene/octene elastomer and ethylene/butene elastomer.

Example 1.19

The label according to example 1.17 or 1.18, wherein an amount of polyolefin plastomer and/or polyolefin elastomer is between 2 and 50 wt. %, preferably between 5 and 35 wt. % and more preferably between 10 and 30 wt. %

Example 1.20

The label according to any of preceding examples, wherein the multilayer face film has a density between 0.90 and 0.99 g/cm$^3$. Alternatively the multilayer face film has a density between 0.90 and 0.98 g/cm$^3$.

Example 1.21

The label according to any of the preceding examples, wherein the label is configured to shrink in the direction of the orientation of the face film at least 15%, preferably at least 25%, or preferably at least 35% at a temperature between 65 and 98° C.

Example 1.22

The label according to any of the preceding examples, wherein the label is configured to shrink in the direction of the orientation of the face film between 20 and 70% at a temperature between 65 and 98° C.

Example 1.23

The label according to example 1.21, wherein the label is configured to shrink between 25 and 65% at the temperature between 65 and 98° C.

Example 1.24

The label according to any of the preceding examples, wherein the label is configured to shrink less than 10% at a temperature below 65° C.

Example 1.25

The label according to any of the preceding examples, wherein the face film is oriented in machine direction.

Example 1.26

The label according to any of the examples 1.1-1.24, wherein the face film is oriented in transverse direction.

Example 1.27

A use of a heat shrink label according to any of the examples 1.1-1.26 for labelling of a container comprising an uneven surface, wherein a difference between the smallest diameter and the largest diameter of the container is between 20 and 80%, preferably between 30 and 70%.

Example 1.28

A use of a heat shrink label according to any of the examples 1.1-1.26 for labelling of batteries.

Example 1.29

A use of a heat shrink label according to any of the examples 1.1-1.26 for label laminates further comprising an adhesive layer for attaching the label to an item. Label laminate may also include a release liner. The label laminate may be a pressure-sensitive label laminate. The label laminate may be a wash-off label configured to be detached form the item labelled during subsequent washing process.

Example 1.30

A heat shrink label film, wherein the heat shrink label film is oriented in one direction, and includes a layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer is below 50° C. and a glass transition temperature of the second cyclic olefin copolymer is between 5 and 60° C. higher than the glass transition temperature of the first cyclic olefin copolymer.

Example 1.31

A combination of a heat shrink label according to any of the example 1.1-1.26 and an item, wherein a leading end of the label and a trailing end of the label are overlapped on the external surface of the item, and wherein at least most of a label surface between the leading edge and the trailing edge is next to the external surface of the item.

Example 1.32

The combination of a heat shrink label and an item according to example 1.31, wherein a difference between the smallest diameter and the largest diameter of the item is between 20 and 80%, preferably between 30 and 70%.

Example 1.33

The combination of a heat shrink label and an item according to example 1.31 or 1.32, wherein the item comprises polyethylene terephthalate.

Example 1.34

The combination of a heat shrink label and an item according to any of the examples 1.31-1.33, wherein the item is a bottle consisting of polyethylene terephthalate.

Example 1.35

A method for providing a heat shrink label, the method comprising:
  providing a multilayer face film comprising a first layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer is below 50° C. and a glass transition temperature of the second cyclic olefin copolymer is between 5 and 60° C. higher than the glass transition temperature of the first cyclic olefin copolymer;
  stretching the multilayer face film in one direction;
  cooling the stretched multilayer face film so as to provide shrink potential for the multilayer face film in said one direction.

Example 1.36

The method according to example 1.35, wherein the face film is stretched in said one direction with a ratio of unstretched film thickness to stretched film thickness between 2 and 10. In other words, the face film may be stretched in the one direction with a stretching ratio of between 2:1 and 10:1.

Example 1.37

The method according to example 1.35 or 1.36, wherein the face film is stretched in machine direction of the film.

Example 1.38

The method according to example 1.36 or 1.37, wherein the face film is stretched in transverse direction of the film.

Example 1.39

A method for labelling of an item, wherein a label comprises an oriented multilayer face film including a first layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer is below 50° C. and a glass transition temperature of the second cyclic olefin copolymer is between 5 and 60° C. higher than the glass transition temperature of the first cyclic olefin copolymer, the method comprising:
  wrapping the label around the item, wherein the orientation direction of the multilayer face film is extending circumferentially around the item;
  seaming the label by gluing, laser welding, heat sealing, or ultrasonic bonding;
  heating the label at temperature between 65 and 98° C. so as to form a tight fitting label for the item.

Example 1.40

A method for separating a heat shrink label from an item labelled, the label comprising an oriented multilayer face film comprising a first layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer is below 50° C. and a glass transition temperature of the second cyclic olefin copolymer is between 5 and 60° C. higher than the glass transition temperature of the first cyclic olefin copolymer, the method comprising:
  crushing said labelled item into pieces,
  exposing the pieces of labelled item to re-cycling process comprising heated liquid having a density more than density of the label and less than density of the item,
  collecting the separated pieces of the item sunk in the washing liquid,
  collecting the separated pieces of the labels floating on the washing liquid.

For the person skilled in the art, it will be clear that modifications and variations of the products and the methods according to the present invention are perceivable. The drawings are schematic. The particular embodiments described above with reference to the accompanying drawings are illustrative only and not meant to limit the scope of the invention, which is defined by the appended claims.

The invention claimed is:
1. A shrink label capable to shrink under exposure to external energy, the shrink label comprising:

an uniaxially oriented multilayer face film including a first skin layer forming an uppermost layer of the face film and a second skin layer forming an undermost layer of the face film, wherein said skin layers comprise:
at least one of the following polyethylene polymers: low density polyethylene, medium density polyethylene and linear low density polyethylene;
at least two cyclic polymers, wherein the at least two cyclic polymers are cyclic olefin copolymers of norbornene and ethene,
and wherein the at least two cyclic polymers comprise different glass transition temperatures between 30 and 100° C. and the difference between the glass transition temperatures is between 5 and 60° C.;
and wherein the multilayer face film is turned over itself so that opposite edges of the multilayer face film are overlapping and forming an area wherein the first skin layer and the second skin layer are adjacent to each other and bonded together by a solvent so as to form a seam for the shrink label.

2. A shrink label according to claim 1, wherein the at least two cyclic polymers comprises one cyclic polymer having the glass transition temperature below 70° C. and another cyclic polymer having the glass transition temperature above 70° C.

3. A shrink label according to claim 1, wherein the at least two cyclic polymers comprise one cyclic polymer and another cyclic polymer, wherein an amount of the one cyclic copolymer is between 44 and 77 wt. % based on the total weight of the skin layer and an amount of the another cyclic copolymer is between 10 and 44 wt. % based on the total weight of the skin layer.

4. A shrink label according to claim 1, wherein an amount of polyethylene polymer(s) is between 5 and 20 wt. % based on the total weight of the skin layer.

5. A shrink label according to claim 1, wherein the polyethylene polymer is one of the following: copolymer of ethylene and 1-octene, and copolymer of ethylene and hexene.

6. A shrink label according to claim 1, wherein the solvent is one of the following: alpha-pinene, limonene, mixture of tetrahydrofuran and 1,3-dioxolene, o-chlorotoluene, 4-chlorotoluene, and p-chlorobenzotrifluoride.

7. A shrink label according to claim 1, wherein the uniaxially oriented multilayer face film comprises an orientation ratio of at least 3.

8. A shrink label according to claim 1, wherein the multilayer face film is uniaxially oriented in a transverse direction and the transverse direction extends around a circumference of the shrink label.

9. A shrink label according to claim 1, wherein the multilayer film is capable to shrink in a uniaxial orientation direction of the face film between 20 and 75% at a temperature between 65 and 98° C.

10. A shrink label according to claim 1, wherein the multilayer face film has a three layer structure further comprising a core layer between the first skin layer and the second skin layer.

* * * * *